US008847890B2

(12) United States Patent
Peterson et al.

(10) Patent No.: US 8,847,890 B2
(45) Date of Patent: Sep. 30, 2014

(54) LEVELED TOUCHSURFACE WITH PLANAR TRANSLATIONAL RESPONSIVENESS TO VERTICAL TRAVEL

(75) Inventors: Cody G. Peterson, Coeur d'Alene, ID (US); Douglas M. Krumpelman, Hayden, ID (US); Michael D. Levin, Los Altos, CA (US)

(73) Assignee: Synaptics Incorporated, San Jose, CA (US)

( * ) Notice: Subject to any disclaimer, the term of this patent is extended or adjusted under 35 U.S.C. 154(b) by 210 days.

(21) Appl. No.: 13/198,610

(22) Filed: Aug. 4, 2011

(65) Prior Publication Data

US 2012/0268384 A1 Oct. 25, 2012

Related U.S. Application Data

(60) Provisional application No. 61/429,749, filed on Jan. 4, 2011, provisional application No. 61/471,186, filed on Apr. 3, 2011.

(51) Int. Cl.
*G06F 3/02* (2006.01)
*H01H 13/85* (2006.01)

(52) U.S. Cl.
CPC ......... *H01H 13/85* (2013.01); *H01H 2221/058* (2013.01); *H01H 2227/036* (2013.01); *H01H 2221/04* (2013.01); *H01H 2215/042* (2013.01)
USPC ............................ 345/168; 200/344; 200/345

(58) Field of Classification Search
USPC .................. 345/156–184; 200/5 A, 341–345; 335/202, 205–207; 341/22, 27, 32, 34; 400/450–496
See application file for complete search history.

(56) References Cited

U.S. PATENT DOCUMENTS 3,886,341 A 5/1975 Forrest
3,938,642 A 2/1976 Van Rumpt et al.
4,039,068 A 8/1977 Giorza et al.
4,056,701 A 11/1977 Weber (Continued)

FOREIGN PATENT DOCUMENTS

DE 19704253 A 8/1998
DE 10126670 A1 12/2002

(Continued)

OTHER PUBLICATIONS

United States Patent and Trademark Office, US Non-final Office Action for U.S. Appl. No. 12/975,733 dated Oct. 25, 2013.

(Continued)

*Primary Examiner* — Dmitriy Bolotin
(74) *Attorney, Agent, or Firm* — Ingrassia Fisher & Lorenz P.C.

(57) ABSTRACT

Described herein are techniques related to a leveled touchsurface with planar translational responsiveness to vertical travel. Examples of a touchsurface include a key of a keyboard, touchpad of a laptop, or a touchscreen of a smartphone or tablet computer. With the techniques described herein, the touchsurface is constrained to remain in a level orientation while a user presses the touchsurface like a button or key. Also, with the techniques described herein, a planar-translation-effecting mechanism imparts a planar translation to the touchsurface while it travels vertically (e.g., downward) as the user presses the touchsurface. This Abstract is submitted with the understanding that it will not be used to interpret or limit the scope or meaning of the claims.

22 Claims, 24 Drawing Sheets

(56) References Cited

U.S. PATENT DOCUMENTS 4,265,557 A 5/1981 Runge
4,294,555 A 10/1981 Galaske et al.
4,326,195 A 4/1982 Seki et al.
4,334,280 A 6/1982 Mcdonald
4,403,123 A 9/1983 Shek
4,480,162 A 10/1984 Greenwood
D278,239 S 4/1985 Felix et al.
D284,574 S 7/1986 Fischer
D292,801 S 11/1987 Davis, Jr. et al.
4,735,520 A 4/1988 Suzuki et al.
4,786,766 A 11/1988 Kobayashi
4,885,565 A 12/1989 Embach
D312,623 S 12/1990 Carter et al.
5,053,591 A 10/1991 Theurer
5,121,091 A 6/1992 Fujiyama
5,189,390 A 2/1993 Fagard
5,212,473 A 5/1993 Louis
5,239,152 A 8/1993 Caldwell et al.
5,329,278 A 7/1994 Dombroski
5,418,530 A 5/1995 Moore et al.
5,463,195 A 10/1995 Watanabe et al.
5,575,576 A 11/1996 Roysden, Jr.
5,626,223 A 5/1997 Lee
5,667,061 A 9/1997 Lee
5,763,842 A 6/1998 Tsai et al.
5,767,463 A 6/1998 Gandre
5,828,015 A 10/1998 Coulon
5,902,972 A 5/1999 Nestor et al.
5,921,382 A 7/1999 Retter
5,934,454 A 8/1999 Burleson et al.
5,973,670 A 10/1999 Barber et al.
5,977,867 A 11/1999 Blouin
5,977,888 A * 11/1999 Fujita et al. .................... 341/34
5,982,304 A 11/1999 Selker et al.
6,039,258 A 3/2000 Durbin et al.
6,046,730 A 4/2000 Bowen et al.
6,067,081 A 5/2000 Hahlganss et al.
6,118,435 A 9/2000 Fujita et al.
6,166,662 A 12/2000 Chuang
6,218,966 B1 4/2001 Goodwin et al.
6,219,034 B1 4/2001 Elbing et al.
6,262,717 B1 7/2001 Donohue et al.
6,328,489 B1 12/2001 Chi-Pin
6,369,803 B2 4/2002 Brisebois et al.
6,373,463 B1 4/2002 Beeks
6,375,372 B1 4/2002 Tsau
6,392,515 B1 5/2002 Van Zeeland et al.
6,429,846 B2 8/2002 Rosenberg et al.
6,430,023 B1 8/2002 Suzuki
6,455,794 B2 9/2002 Sato et al.
6,466,118 B1 10/2002 Van Zeeland et al.
6,542,058 B2 4/2003 Van Zeeland
6,563,434 B1 5/2003 Olodort et al.
6,657,139 B2 12/2003 Hasunuma
6,677,843 B1 1/2004 Monroe et al.
6,693,626 B1 2/2004 Rosenberg
6,723,935 B1 4/2004 Watanabe
6,723,937 B2 4/2004 Engelmann et al.
6,750,415 B2 6/2004 Yamagami
6,761,494 B2 7/2004 Hsu et al.
6,819,990 B2 11/2004 Ichinose
6,822,635 B2 11/2004 Shahoian et al.
6,861,603 B1 3/2005 Wang
6,880,994 B2 4/2005 Takahashi
6,911,901 B2 6/2005 Bown
6,937,124 B1 8/2005 Nakamura et al.
6,939,065 B2 9/2005 Roysden, Jr.
6,940,030 B2 9/2005 Takeda et al.
6,982,617 B2 1/2006 Brilon et al.
D527,004 S 8/2006 Yen
7,106,305 B2 9/2006 Rosenberg
7,113,177 B2 9/2006 Franzen
7,119,798 B2 10/2006 Yoshikawa et al.
7,148,789 B2 12/2006 Sadler et al.
7,166,795 B2 1/2007 Lengeling
7,182,691 B1 2/2007 Schena
7,196,688 B2 3/2007 Schena
7,215,329 B2 5/2007 Yoshikawa et al.
7,227,537 B2 6/2007 Nakayama et al.
7,269,484 B2 9/2007 Hein
7,292,227 B2 11/2007 Fukumoto et al.
7,312,791 B2 12/2007 Hoshino et al.
7,324,094 B2 1/2008 Moilanen et al.
7,336,266 B2 2/2008 Hayward et al.
7,339,572 B2 3/2008 Schena
7,342,573 B2 3/2008 Ryynaenen
7,375,656 B2 5/2008 Muller et al.
7,385,308 B2 6/2008 Yerdon et al.
7,400,319 B2 7/2008 Nakayama et al.
7,450,110 B2 11/2008 Shahoian et al.
7,525,415 B2 4/2009 Yatsu et al.
7,548,232 B2 6/2009 Shahoian et al.
7,567,232 B2 7/2009 Rosenberg
7,569,786 B2 8/2009 Spies
7,573,460 B2 8/2009 Strawn et al.
7,579,758 B2 8/2009 Maruyama et al.
7,589,607 B2 9/2009 Rochon et al.
7,592,901 B2 9/2009 Furusho
7,592,999 B2 9/2009 Rosenberg et al.
7,602,384 B2 10/2009 Rosenberg et al.
7,607,087 B2 10/2009 Prados
7,701,440 B2 4/2010 Harley
7,855,715 B1 12/2010 Bowen
7,868,515 B2 1/2011 Krochmal et al.
7,898,440 B2 3/2011 Chen
7,906,875 B2 3/2011 Caldwell et al.
8,094,130 B2 1/2012 Griffin et al.
8,217,289 B2 7/2012 Liu
8,222,799 B2 7/2012 Polyakov et al.
8,245,158 B1 * 8/2012 Schrick ......................... 715/864
8,248,278 B2 8/2012 Schlosser et al.
8,309,870 B2 * 11/2012 Peterson et al. .............. 200/344
8,451,426 B2 5/2013 Iino
2001/0002648 A1 6/2001 Van Zeeland
2002/0054060 A1 5/2002 Schena
2002/0084721 A1 7/2002 Walczak
2002/0149561 A1 10/2002 Fukumoto et al.
2003/0067449 A1 4/2003 Yoshikawa et al.
2003/0209131 A1 11/2003 Asahi
2003/0210233 A1 11/2003 Frulla
2004/0252104 A1 12/2004 Nakamura et al.
2005/0017947 A1 1/2005 Shahoian et al.
2005/0157893 A1 7/2005 Pelrine et al.
2005/0204906 A1 9/2005 Lengeling
2005/0237309 A1 10/2005 Sharma
2006/0109256 A1 5/2006 Grant et al.
2006/0113880 A1 6/2006 Pei et al.
2006/0256075 A1 11/2006 Anastas et al.
2006/0261983 A1 11/2006 Griffin et al.
2007/0031097 A1 2/2007 Heikenfeld et al.
2007/0080951 A1 4/2007 Maruyama et al.
2007/0091070 A1 4/2007 Larsen et al.
2007/0146317 A1 6/2007 Schena
2007/0146334 A1 6/2007 Inokawa
2007/0152974 A1 7/2007 Kim et al.
2007/0193436 A1 8/2007 Chu
2007/0205988 A1 9/2007 Gloyd et al.
2007/0234887 A1 10/2007 Sawada et al.
2007/0234890 A1 10/2007 Yamashita
2007/0236449 A1 10/2007 Lacroix et al.
2007/0236450 A1 10/2007 Colgate et al.
2008/0007529 A1 1/2008 Paun et al.
2008/0083314 A1 4/2008 Hayashi et al.
2008/0084384 A1 4/2008 Gregorio et al.
2008/0087476 A1 4/2008 Prest et al.
2008/0092720 A1 4/2008 Yamashita et al.
2008/0100568 A1 5/2008 Koch et al.
2008/0165127 A1 7/2008 Eom
2008/0289952 A1 11/2008 Pelrine et al.
2008/0302647 A1 12/2008 Villain et al.
2008/0303782 A1 12/2008 Grant et al.
2009/0002205 A1 1/2009 Klinghult et al.
2009/0046069 A1 2/2009 Griffin et al.
2009/0072662 A1 3/2009 Sadler et al.

(56) References Cited

U.S. PATENT DOCUMENTS

| | | | | |
|---|---|---|---|---|
| 2009/0073128 | A1 | 3/2009 | Marsden | |
| 2009/0079593 | A1 | 3/2009 | Yamakawa et al. | |
| 2009/0128501 | A1 | 5/2009 | Lazaridis et al. | |
| 2009/0178913 | A1 | 7/2009 | Peterson et al. | |
| 2009/0189790 | A1 | 7/2009 | Peterson et al. | |
| 2009/0189873 | A1 | 7/2009 | Peterson et al. | |
| 2009/0210568 | A1 | 8/2009 | Peterson et al. | |
| 2009/0231277 | A1 | 9/2009 | Peterson et al. | |
| 2009/0255793 | A1 | 10/2009 | Krochmal et al. | |
| 2010/0109486 | A1 | 5/2010 | Polyakov et al. | |
| 2010/0171715 | A1 | 7/2010 | Peterson et al. | |
| 2010/0231423 | A1 | 9/2010 | Yang | |
| 2010/0245231 | A1 | 9/2010 | Aramaki | |
| 2011/0096013 | A1 | 4/2011 | Krumpelman et al. | |
| 2011/0128239 | A1 | 6/2011 | Polyakov et al. | |
| 2011/0203912 | A1 | 8/2011 | Niu | |
| 2011/0227872 | A1 | 9/2011 | Huska et al. | |
| 2011/0234494 | A1 | 9/2011 | Peterson et al. | |
| 2012/0043191 | A1 | 2/2012 | Kessler et al. | |
| 2012/0092263 | A1 | 4/2012 | Peterson et al. | |
| 2012/0169603 | A1 * | 7/2012 | Peterson et al. | 345/168 |
| 2012/0299832 | A1 * | 11/2012 | Peterson et al. | 345/168 |

FOREIGN PATENT DOCUMENTS

| | | | |
|---|---|---|---|
| DE | 2005002417 | A | 4/2005 |
| DE | 2004005501 | A | 8/2005 |
| EP | 0278916 | A | 8/1988 |
| EP | 1310860 | A | 5/2003 |
| EP | 1548776 | A | 6/2005 |
| EP | 2003666 | A1 * | 12/2008 |
| EP | 2287873 | A | 2/2011 |
| JP | 2000348562 | A | 12/2000 |
| JP | 2007173087 | A | 7/2007 |
| JP | 2011233406 | A | 11/2011 |
| WO | 0191100 | A | 11/2001 |
| WO | 02073587 | A | 9/2002 |
| WO | 2009043605 | A | 4/2009 |
| WO | 2009067708 | A1 | 5/2009 |
| WO | 2009097358 | A | 8/2009 |
| WO | 2009097359 | A | 8/2009 |
| WO | 2009097361 | A2 | 8/2009 |
| WO | 2009114827 | A | 9/2009 |

OTHER PUBLICATIONS

Raisamo, Roope “Tactile User Interfaces”, New Interaction Techniques,(Aug. 2, 2001),30 pages.

Seeger, Joseph et al., “Dynamics and Control of Parallel-Plate Actuators Beyond the Electrostatic Instability”, Transducers "99 The 10th International Conference on Solid State Sensors and Actuators, (Jun. 1999),pp. 474-477.

Sommer-Larsen, Peter “Artificial Muscles”, Rise National Laboratory, Condensed Matter Physics and Chemistry Department,3 pages.

Spires, Shelby “Artificial Strongman”, Smart Business: For The New Economy, (Nov. 2000),1 page.

Srinivasan, Mandayam A., et al, “Role of Skin Biomechanics in Mechanoreceptor Response”, Retrieved from <http://touchlab.mit.edu/oldresearch/currentwork/humanhaptics/roleofsk-inbiomechanics/> on Dec. 20, 2007, MIT Touch Lab, (Dec. 20, 2007),pp. 1-13.

Supplemental Notice of Allowance mailed May 20, 2010, U.S. Appl. No. 11/945,879, 5 pages.

Wagner, Christopher et al., “Integrating Tactile and Force Feedback with Finite Element Models”, Division of Engineering and Applied Sciences, Harvard University,6 pages.

Wagstaff, Jeremy, “A Passion for the Keys”, The Wall Street Journal Online, Nov. 23, 2007, 3 pages, retrieved from the Internet at online.wsj.com/article_print/SB119578337324301744.html.

Wing, Alan et al., “Multidimensional Haptics Preliminary Report”, Retrieved from <http://www.touch-hapsys.org>, (Sep. 21, 2003),pp. 1-125.

Wingert, Andreas et al., “On the Kinematics of Parallel Mechanisms with Bio-stable Polymer Actuators”, Department of Mechanical Engineering, Massachusetts Institute of Technology Cambridge,8 pages.

Wu, Xingtao et al., “A Generalized Capacitance-Based Model for Electrostatic Micro-Actuators”, Department of Physics, New Jersey Institute of Technology, Newark, NJ, 07102-1982 Department of Mechanical Engineering, Columbia University, NY 10027, pp. 1-23.

Yang, Gi-Hun, “Novel Haptic Mouse System for Holistic Haptic Display and Potential of Vibrotactile Stimulation”, Human-Robot Interaction Research Center, Korea Advanced Institute of Science and Technology, 2005, 17 pages.

Zou, Jun et al., “Design of a Wide Turning Range Micromachined Turnable Capacitor for Wireless Communications”, First IEEE Electro/Information Technology Conference, Jun. 8-11, Chicago, IL, 2000, 6 pages.

Non-Final Office Action mailed May 14, 2012, U.S. Appl. No. 13/323,292, 19 pages.

“Final Office Action mailed Aug. 1, 2012”, U.S. Appl. No. 12/580,002, 23 pages.

“Elastomers: Powerful Polymer”, Retrieved from <http://appliancedesign.com/copyright/>, (Jun. 2006),5 pages.

“Haptic Touch Technology”, Pacinian,(Nov. 2007),2 pages.

“Haptics: Learning Through Touch”, Retrieved from <http://ced.ncsu.edu/nanoscale/haptics.htm>, (2004),5 pages.

“International Search Report and Written Opinion”, Application No. PCT/US2010/020380, (Apr. 12, 2010),10 pages.

“Nanoactuators Based on Electrostatic Forces on Dielectrics”, Retrieved from <http://www.nasatech.com/Briefs/Apr05/NPO30747.html>on Nov. 28, 2005, NASA’s Jet Propulsion Laboratory, Pasadena, CA,4 pages.

“New Sri International sSpin-Off, Artificial Muscle, Inc., Secure Series a Funding from Leading VC Firms”, Retrieved from <http://www.sri.com/news/releases/05-03-04.html> on Jan. 30, 2008, SRI International Spin Offs Artificial Muscle, Inc,(May 2004),2 pages.

“Non-Final Office Action mailed Dec. 9, 2011”, U.S. Appl. No. 12/580,002, 21 pages.

“Proposed Experiment Protocol and Details”, Retrieved from <http://bdml.stanford.edu/twiki/bin/view/Haptics/ProposedExperi0mentPr-otocolAndDetails>, 5 pages.

“Tactile Perception and Design”, Retrieved from http://www.tireesias.org/reports.tpd2.htm on Apr. 4, 2006, 10 pages.

“Touch and Haptics”, 2004 IEEE/ RSJ International Conference on Intelligent Robots and Systems, (Sep. 28, 2004),32 pages.

“Touch-Hapsys”, Retrieved from <http://www.touch-hapsys.org>, 2 pages.

Ashley, Steven “Artificial Muscles”, Scientific American, Available at <www.sciam.com>,(Oct. 2003),pp. 53-59.

Bar-Cohen, Y. “Electroactive Polymer (EAP) Actuators as Artificial Muscles—Reality, Potential and Challenges”, SPIE Press, (Mar. 18, 2004),pp. 26 and 548-550.

Bar-Cohen, Yoseph “Electric Flex”, IEEE Spectrum Online, (Jun. 2004),6 pages.

Bar-Cohen, Yoseph “Electroactive Polymers as Artificial Muscles-Capabilities, Potentials and Challenges”, Robotics 2000, Available at <www.spaceandrobotics>,(Feb. 28-Mar. 2, 2000),pp. 1-8.

Bar-Cohen, Yoseph “Electroactive Polymers”, Retrieved from <http://electrochem.cwru.edu/ed/encycl/>, Electrochemistry Encyclopedia,(Dec. 2004),7 pages.

Bar-Cohen, Yoseph “Low Mass Muscle Actuators (LoMMAs)”, Telerobotic Task Sponsored by NASA HQ, Code S, (Oct. 23, 1997),18 pages.

Bar-Cohen, Yoseph “Worldwide Electroactive Polymers”, (Artificial Muscles) Newsletter, vol. 7, No. 2, Available at <http://eap.jpl.nasa.gov>,(Dec. 2005),pp. 1-16.

Bar-Cohen, Yoseph et al., “Enabling Novel Planetary and Terrestrial Mechanisms Using Electroactive Materials at the JPL’s NDEAA Lab”, Retrieved from http://ndeaa.jpl.nasa.gov>, pp. 1-6.

Bark, Karlin “Functional Prototype I”, Retrieved from <http://bdml.stanford.edu/twiki/bin/view/Haptics/FunctionalPrototypel?-skin=print.pattern>, (Aug. 9, 2005),3 pages.

Beavers, Alex “Basic Concepts for Commercial Applications of Electroactive Polymer Artificial Muscle”, Artificial Muscle Incorporated, Menlo Park, CA,10 pages.

(56) References Cited

OTHER PUBLICATIONS

Bicchi, Antonio et al., "Haptic Illusions Induced by the Tactile Flow", Interdepartmental Research Centre "E. Piaggo", University of Pisa,12 pages.
Bifano, Thomas "Parallel Plate Electrostatic Actuation for High-Resolution Deformable Mirrors", Boston University, (Aug. 19, 2004),35 pages.
Bifano, Thomas, "Parallel Plate Electrostatic Actuation for High-Resolution Deformable Mirrors", Boston University, Boston, MA, Aug. 19, 2004.
Biggs, James "Some Useful Information for Tactile Display Design", IEEE Transactions on Man-Machine Systems, vol. 11, No. 1,(1970),pp. 19-24.
Carpi, Federico et al., "Dielectric Elastomers as Electromechanical Transducers: Fundamentals, Materials, Devices, Models and Applications of an Emerging Elecrotactive Polymer Technology", Elsevier Ltd., (2008),12 pages.
Fontaine, Ebraheem "A Laboratory Demonstration of a Parallel Robotic Mechanism", Massachusetts Institute of Technology,(Jun. 2002),pp. 1-14.
Fukumoto, Masaki, et al, "Active Click: Tactile Feedback for Touch Panels", NTT DoCoMo Multimedia Labs, Mar. 31, 2001, 2 pages.
Gorinevsky, Dimitry "Adaptive membrane for large lightweight space telescopes", SPIE Astronomical Telescopes and Instrumentation,(2002),pp. 1-9.
Hayward, Vincent et al., "Tactile Display Device Using Distributed Lateral Skin Stretch", Proceedings of the Haptic Interfaces for Virtual Environment and Teleoperator Systems Symposium, ASME International Mechanical Engineering Congress & Exposition,(2000),pp. 1309-1314.
Hollis, Ralph "Haptics", Berkshire Encyclopedia of Human-Computer Interaction, Berkshire Publishing Group,(2004), pp. 311-316.
Jager, Edwin et al., "Microfabricating Conjugated Polymer Actuators", Science Magazine, vol. 290, www.sciencemag.org,(Nov. 24, 2000),pp. 1540-1544.
Jones, Gail et al., "A Comparison of Learning with Haptic and Visual Modalities", National Science Foundation REC-0087389,pp. 1-20.
Jones, Lynette "Human Factors and Haptic Interfaces", Department of Mechanical Engineering, Massachusetts Institute of Technology,40 pages.
Jungmann, M., et al, Miniaturised Electrostatic Tactile Display with High Structural Compliance, 2002, 6 pages.
Kajimoto, Hiroyuki et al., "Electro-Tactile Display with Tactile Primary Color Approach", Graduate School of Information and Technology, The University of Tokyo,2 pages.
Mackenzie, Scott, et al, "The Tactile Touchpad", 1997, 5 pages.
Mackenzie, Scott, et al., "A Comparison of Three Selection Techniques for Touchpads", Proceedings of the CHI'98 Conference on Human Factors in Computing Systems, pp. 336-343 New York 1998.
Mok Ha, Soon et al., "Interpenetrating Polymer Networks for High-Performance Electroelastomer Artificial Muscles", Department of Materials Science and Engineering, UCLA,pp. 1-19.
Non-Final Office Action mailed Feb. 13, 2009, U.S. Appl. No. 11/945,879.
Odell, D.L. et al., "MicroRobot Conveyance and Propulsion System Using Comb Drive and Parallel Plate Actuators: The ScuttleBot", UC Berkley,4 pages.
O'Halloran, A et al., "Materials and Technologies for Artificial Muscle: A Review for the Mechatronic Muscle Project", Topics in Bio-Mechanical Engineering, Chapter 7, Department of Electronic Engineering, National University of Ireland Galway,(2004),pp. 184-215.
Oniszczak, Aleks, "VersaPad Driver Plus Pack", 1999, 3 pages.
Pasquero, Jerome "Stimulation of the Fingertip by Lateral Skin Strech", Retrieved from <http://www.cim.mcgill.ca/.about.jay/index.sub.—files/research.htm&gt- ;, 5 pages.
Pasquero, Jerome "Stress: A Tactile Display Using Lateral Skin Stretch", Department of Electrical and Computer Engineering McGill University, Montreal,(Oct. 2003),75 pages.
Pasquero, Jerome "Survey on Communication Through Touch", Technical Report: TR-CIM 06.04, Center for Intelligent Machines Department of Electrical and Computer Engineering,(Jul. 2006),pp. 1-27.
Pasquero, Jerome "Tactile Display Survey", Technical Report TR-CIM 06.04,6 pages.
Pei, Qibing et al., "Multiple-Degrees-of-Freedom Electroelastomer Roll Actuators", SRI International Institute of Physics Publishing, (2004),pp. N86-N92.
Poupyrev, Ivan, et al., "Tactile Interfaces for Small Touch Screens", 2003, 4 pages.
Poupyrev, Ivan, et al., "TouchEngine: A Tactile Display for Handheld Devices", 2002, 2 pages.
USPTO, Non-Final Office Action in U.S. Appl. No. 13/568,060, mailed Apr. 18, 2014.

* cited by examiner

*(background)*

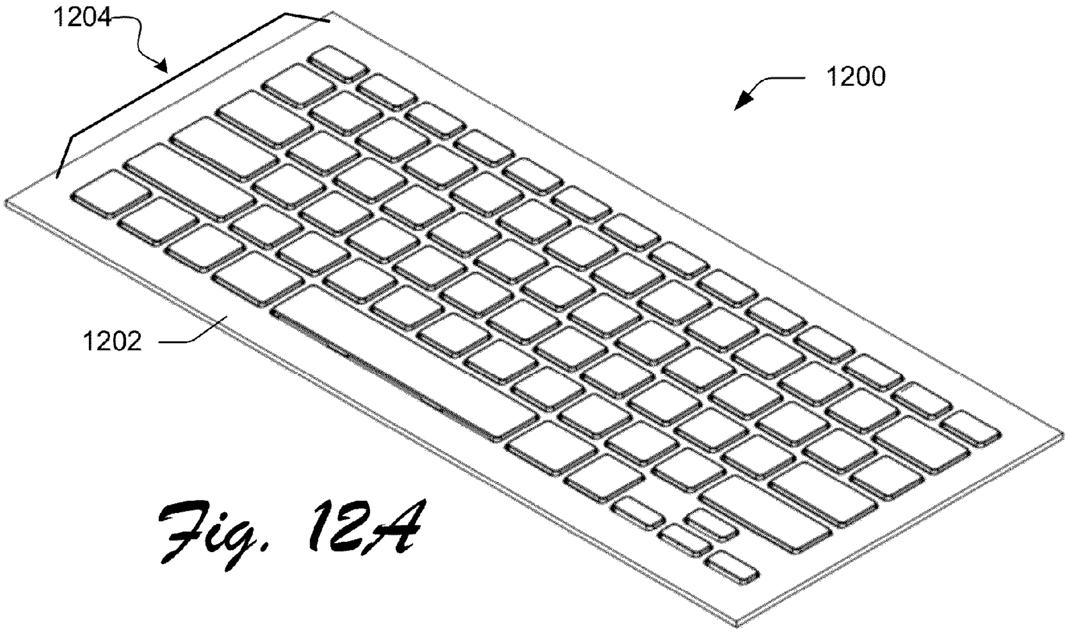
Fig. 12A
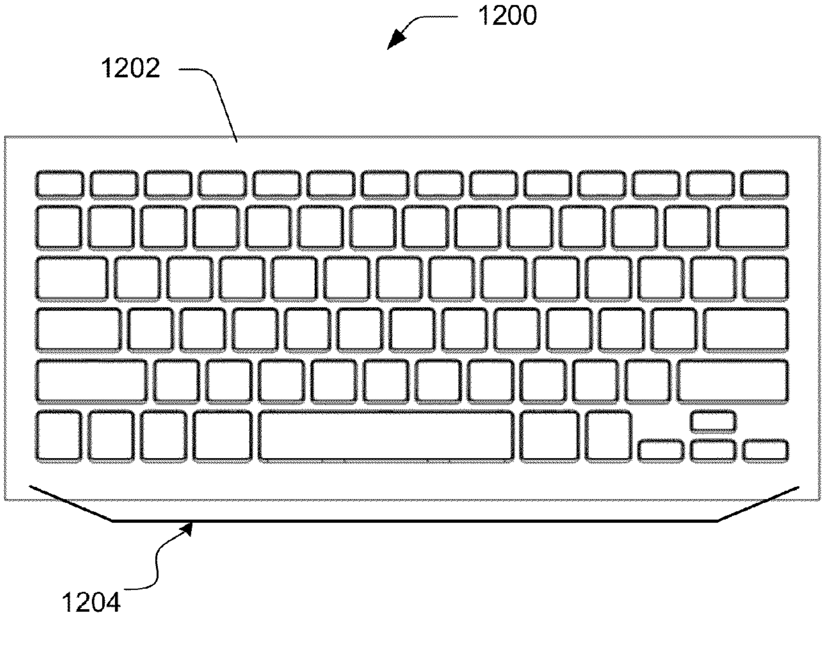
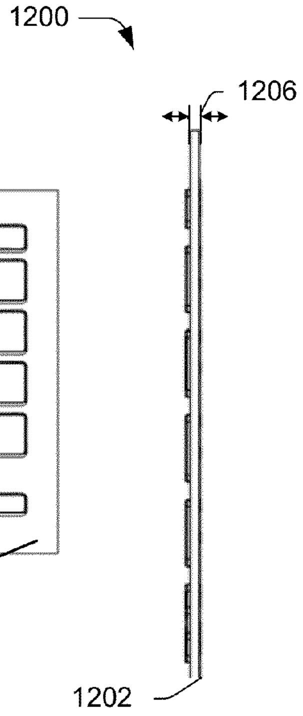
Fig. 12B
Fig. 12C

LEVELED TOUCHSURFACE WITH PLANAR TRANSLATIONAL RESPONSIVENESS TO VERTICAL TRAVEL

RELATED APPLICATION

This application claims the benefit of priority of U.S. Provisional Patent Application Ser. No. 61/429,749, filed on Jan. 4, 2011 and U.S. Provisional Patent Application Ser. No. 61/471,186, filed on Apr. 3, 2011, the disclosures of which are incorporated by reference herein.

BACKGROUND

FIG. 1 illustrates a side elevation view of simplified key mechanics 100 of a conventional keyboard of a typical computer system. Stripped down to its essentials, the conventional key mechanics 100 include a key 110, a collapsible elastomeric plunger (i.e., "rubber dome") 120, a scissor-mechanism 130, and a base 140.

The rubber dome 120 provides a familiar snap-over feel to a user while she presses the key to engage the switch under the key 110 and on or in the base 140. The primary purpose for the scissor-mechanism 130 is to level the key 110 during its keypress.

Typically, the scissor mechanism 130 includes at least a pair of interlocking rigid (e.g., plastic or metal) blades (132, 134) that connect the key 110 to the base 140 and/or body of the keyboard. The interlocking blades move in a "scissor"-like fashion when the key 110 travels along its vertical path, as indicated by Z-direction arrow 150. The arrangement of the scissor mechanism 130 reduces the wobbling, shaking, or tilting of the top of the key (i.e., "keytops") 112 while the user is depressing the key 110.

While the scissor mechanism 130 offers some leveling of the keytop, it does not eliminate wobbling, shaking, and tilting of the keytop 112. In addition, the scissor mechanism 130 adds a degree of mechanical complexity to keyboard assembly and repair. Furthermore, mechanisms under the key (such as the scissor mechanism 130 and the rubber dome 120) obscure backlighting under the key 110 and limit how thin a keyboard may be constructed. There is a limit as to how thin the rubber dome 120 and/or the scissor mechanism 130 can be before the familiar snap over feel of a keypress becomes ineffective and/or negatively affected.

Conventional keyboards have reached a threshold of thinness using the existing approaches to construct such keyboards. Rubber domes, scissor mechanisms, and the like have been reduced to the thinnest proportions technically possible while still maintaining the level keypress with a familiar and satisfying snap-over feel.

SUMMARY

Described herein are techniques related to a leveled touchsurface with planar translational responsiveness to vertical travel. Examples of a touchsurface include a key of a keyboard, touchpad of a laptop, or a touchscreen of a smartphone or tablet computer. With the techniques described herein, the touchsurface is constrained to remain in a level orientation while a user presses the touchsurface like a button or key. Also, with the techniques described herein, a planar-translation-effecting mechanism imparts a planar translation to the touchsurface while the touchsurface travels vertically (e.g., downward) as the user presses the touchsurface.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

Each of FIGS. 7A and 8A is the same top plan view of FIG. 4 with the key assembly shown in the ready position.

Each of FIGS. 9A and 10A is the same top plan view of FIG. 4 except that the key assembly is shown in a fully depressed position.

FIGS. 12A, 12B, and 12C are three different views of a thin keyboard that incorporates one or more implementations of touchsurfaces (e.g., keys) that are configured in accordance with the techniques described herein. FIG. 12A is an isometric view of the keyboard. FIG. 5 is top plan view of the keyboard. FIG. 6 is a side elevation view of the keyboard.

FIG. 18A shows the exemplary key assembly in its ready position. FIG. 18B shows the exemplary key assembly in its fully depressed position.

FIGS. 22B and 22C show differing elevation views of the fifth implementation.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
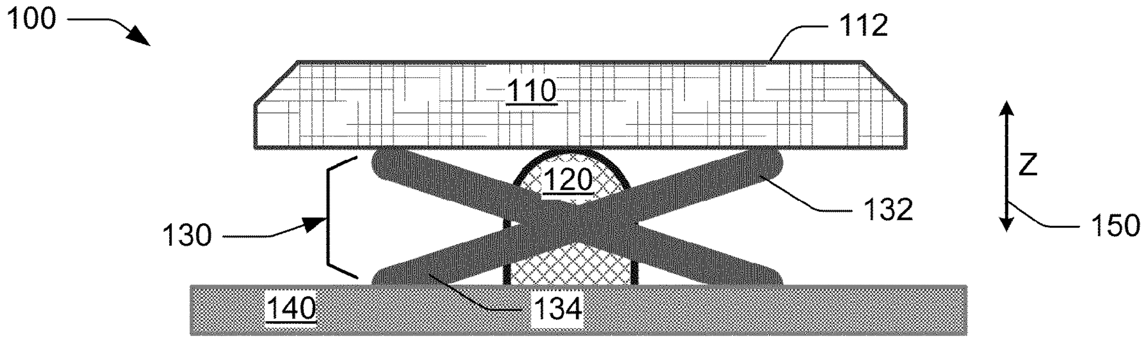
FIG. 1 is a side elevation view of simplified key mechanics of a conventional keyboard of a typical computer system.

Described herein are one or more techniques related to a leveled touchsurface with planar translational responsiveness to vertical travel. A key of a keyboard is one example of a touchsurface of one or more implementations described herein. Other examples of a touchsurface include a touchpad, button on a control panel, and touchscreen.

At least one implementation described herein involves an ultra-thin keyboard with leveled keys having planar translational responsiveness to vertical travel. When a user presses a key, the key remains level in its orientation during its vertical travel. That is, the key (especially its keytop) remains relatively level during its Z-direction travel. The leveling technology described herein reduces or eliminates any wobbling, rocking, or tilting of the key during a keypress.

Unlike the scissor mechanisms of conventional approaches, the key is fully supported about its periphery so that the path of the key during its downstroke is constrained to stay relatively level. For example, in one tilt deflection test performed on a conventional state-of-the-art key and on a prototype of an implementation built in accordance with the techniques described herein, the conventional key deflected 0.231 mm while the prototype key deflected only 0.036 mm. In that test, a force of forty grams was applied to one side of each key. The deflection on both sides was measured and one was subtracted from the other to calculate the tilt deflection. With this test, the prototype key experienced about one-sixth of the tilt deflection of the conventional key. This is to say, that the leveling techniques described herein level a key about six times better than the conventional key leveling approaches.

Furthermore, instead of just traveling vertically as the conventional approaches do, the touchsurface moves in manner that can be called diagonal. That is, the touchsurface moves diagonally while remaining level and without rotation. Because this diagonal movement includes both vertical (up and/or down) as well as planar (side-to-side and/or back-and-forth) components while the touchsurface remains level, the planar component of may be called "planar translation" herein. Since the planar translation occurs in response to the vertical travel of the touchsurface, it may be called "planar translational responsiveness to vertical travel" of the touchsurface (or "planar-translation-responsiveness-to-vertical-travel").

The planar (i.e., lateral) component of the planar translational responsiveness to vertical travel produces a tactile illusion of the touchsurface traveling a larger vertical distance than that which it actually travels. Moreover, after the downpress of the touchsurface, the touchsurface returns to its ready position using, for example, magnetic forces. The movement of the key against a user's finger as the key returns to its ready position also aids in the illusion.

For example, when the user presses an exemplary key on a keyboard employing the planar-translation-responsiveness-to-vertical-travel techniques described herein, the key travels in the Z-direction (e.g., down) a short distance (e.g., 0.5 to 1.0 millimeters) and returns that same distance when released. During its Z-direction (e.g., down) travel, this exemplary key also travels in a lateral or planar direction (e.g., X/Y-direction) approximately the same distance. Of course, the planar direction of travel in proportion to the Z-direction travel may vary with differing implementations.

Although the key only traveled a very short distance in the Z-direction, the user perceives that the exemplary key traveled a much greater distance in the Z-direction. To the user, it feels like the exemplary key traveled two to three times further in the Z-direction than the distance that the key actually did. That perception of extra Z-travel is due in large part to the tangential force imparted on the user's fingertip by the lateral or planar translation of the key during the Z-direction keypress.

The planar-translation-responsiveness-to-vertical-travel technology introduced herein takes advantage of a tactile perceptional illusion where a person misinterprets an atypical force experience of his fingertip as a typical force experience. For example, with the new technology, when a person presses and releases a key of a keyboard, the person feels a force normal to his fingertip as the key presses back against his fingertip as the key moves only in the Z-direction (e.g., up and down) and unexpected tangential forces are misinterpreted as normal forces. In this way, the person obtains a "feel" of a typical key travel of the keys of the keyboard. This is so, at least in part, because humans cannot perceive directionality for sufficiently small motions but can still perceive relative changes in force due to skin shear.

As computers and their components continually decrease in size, there is a need for a thin keyboard. This need is felt acutely in the context of a portable computer (e.g., a laptop or tablet computer). However, key travel distance limits how thin a conventional keyboard can get without sacrificing the "feel" of the keyboard (e.g., according to the International Organization for Standardization (ISO), the typical and preferred key travel is "between 2.0 mm and 4.0 mm.").

With the planar-translation-responsiveness-to-vertical-travel techniques discussed herein, the combination of normal and lateral forces exerted on the user's fingertip during a keypress fools the person into thinking that the key traveled much farther in the Z-direction than it actually did. For example, a key with only a Z-direction key travel of about 0.8 mm may feel more like the key is traveling 2.0 mm or more in the Z-direction. Consequently, super thin keyboards (e.g., less than 3.0 mm thin) may be constructed without sacrificing the "feel" of a quality full travel keyboard.

Furthermore, the techniques described herein employ a ready/return mechanism designed to hold, retain, and/or suspend the key in a position where it is ready to be pressed by a user and also return the key back to its ready-to-be-pressed (i.e., ready position) after the user lifts his finger so as to no longer provide sufficient force to keep the key fully depressed. With at least one implementation described herein, this is accomplished by employing a set of magnets arrayed to be mutually attractive. The magnets hold the key in the ready position and pull the key back into the ready position after there is no longer a sufficient downward force to keep it fully depressed.

While the implementations discussed herein primarily focus on a key and a keyboard, those of ordinary skill in the art should appreciate that other implementations may also be employed. Examples of such implementations include a touchpad, control panel, touchscreen, or any other surface used for human-computer interaction.

Exemplary Key Assemblies

Figure 2A:
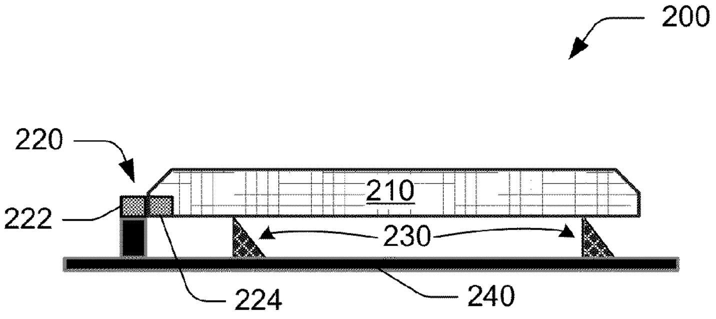
FIG. 2A is an elevation view of a first implementation of a touchsurface configured in accordance with the techniques described herein to provide a satisfying tactile user experience of the leveled touchsurface with planar translational responsiveness to vertical travel. The first implementation is a simplified exemplary key assembly in a ready-to-be-pressed position (i.e., ready position), where the depicted exemplary key assembly is configured in accordance with the techniques described herein.
Figure 2B:
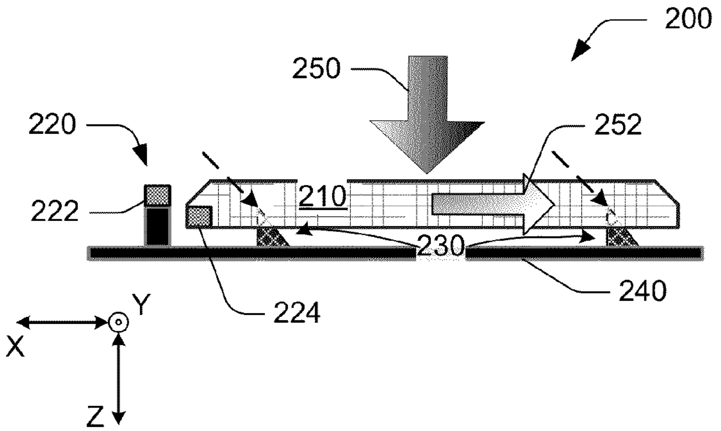
FIG. 2B is an elevation view of the first implementation of FIG. 2A, but shown midway during a keypress.
Figure 2C:
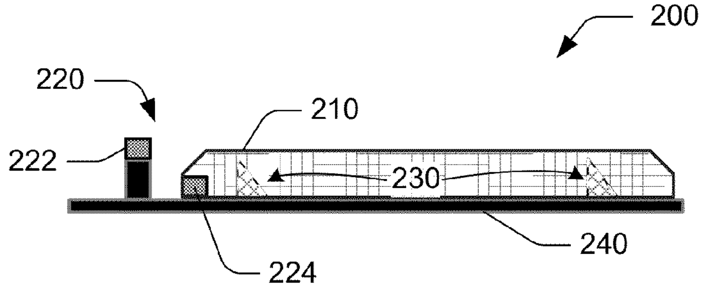
FIG. 2C is an elevation view of the first implementation of FIGS. 2A and 2B, but shown fully depressed.

FIG. 2A shows an elevation view of a simplified exemplary key assembly 200 in a ready-to-be-pressed position (i.e., ready position). FIGS. 2B and 2C show the same key assembly 200 in its progression to a fully depressed position. The key assembly 200 is configured to implement the techniques described herein to provide a satisfying tactile user experience of a touchsurface (e.g., a key) with leveling, planar translation responsiveness to vertical travel.

The key assembly 200 includes a key 210, a ready/return mechanism 220 (with stationary magnet 222 and key magnet 224), a leveling/planar-translation-effecting mechanism 230, and base 240. The key 210 is a specific implementation of the touchsurface that the user touches to interface with a computer. In other implementations, the touchsurface may be something else that the user touches, such as a touchscreen, touchpad, etc.

The ready/return mechanism 220 is configured to hold the key 210 in its ready position so that the key is just that: ready to be pressed by a user. In addition, the ready/return mechanism 220 returns the key 210 back into its ready position after the key is depressed. As shown, the ready/return mechanism 220 accomplishes these tasks by the use of at least a pair of magnets arranged to attract each other. In particular, the stationary magnet 222 is built into a perimeter of a bezel or housing defining a hole or space (which is not depicted in FIGS. 2A-2C) that receives the key 210 when depressed. A key magnet 224 is positioned in and/or under the key 210 in a manner that corresponds with the stationary magnet 222 and in a manner so that the two magnets are mutually attractive. The mutual attraction of the magnets holds the key 210 in its ready position as depicted in FIG. 2A. Of course, alternative implementations may employ different mechanisms or combinations of mechanisms to accomplish the same or similar functionality. For example, alternative implementations may employ springs, hydraulics, pneumatics, elastomeric material, etc.

The leveling/planar-translation-effecting mechanism 230 is located under the key 210 and performs one or both of two functions: leveling the key and/or imparting a planar translation to the key while it is depressed. The leveling/planar-translation-effecting mechanism 230 includes multiple inclined planes or ramps (two of which are shown in FIGS. 2A-2C). The ramps are distributed about the perimetry of the underside of the key 210 in such a manner as to evenly support the key when a downward force is placed on the key. In this way, the key assembly 200 remains level during a keypress.

In at least one implementation, a rectangular key may have one of four ramps positioned under each corner of the key. That is, the ramps act much like four legs of a rectangular table in supporting the table in and about each corner so that table is unlike to wobble, tilt, flip, and the like. In some implementations, the ramps may be positioned along the interior of the underside of the key 210 to provide additional interior support for the key surface. In other implementations, the ramps may be positioned outside the periphery of the key so that arms attached to the key ride/rest on the ramps. In still other implementations, one or more additional ramps or other structures may be positioned inside the perimetry of the underside of the key 210 to provide additional support to the key.

As shown in FIG. 2B and as is typical of a key when pressed, the key 210 moves in a Z-direction when a downward force 250 is applied to the keytop. However, the key 210 responds in an atypical and indeed novel manner to the keypress. As depicted in FIG. 2B, the key 210 also moves in a lateral or planar direction (which is the X-direction as shown) as well as downward. The key 210 rides the ramps of the leveling/planar-translation-effecting mechanism 230 down during the keypress. In so doing, the ramps impart a lateral or planar force component, as represented by planar vector 252, onto the key 210.

In addition, FIGS. 2B and 2C show the magnets (222, 224) of the ready/return mechanism 220 separating in response to the downward and planar translation of the key 210. The attractive force of the magnets provides an additional degree of resistance to the initial keypress. This initial resistance and the ultimate breakaway of the magnets contribute to the feel of the breakover portion of the snapover feel of a traditional full-travel key. See the discussion of the snapover feel of a traditional full-travel key in the co-owned U.S. Provisional Patent Application Ser. No. 61/429,749, filed on Jan. 4, 2011, which is incorporated herein by reference.

FIG. 2C shows the key 210 fully depressed and pressed against the base 240. While there is presumably a key switch between the base and the key (when depressed), it is not depicted here. The key switch indicates that the key has been depressed/selected. Any suitable key switch may be employed for the techniques described herein.

When the user lifts his finger from the key 210 after it is fully depressed, there is no longer a sufficient downward force on the key to keep it depressed. In that situation, the ready/return mechanism 220 returns the key 210 to its ready position as depicted in FIG. 2A. The attractive forces between the magnets (222, 224) pulls the key 210 back up the ramps of the leveling/planar-translation-effecting mechanism 230. Once the magnets (222, 224) return to their original position, the key 210 is in its ready position (as depicted in FIG. 2A) and the key is ready to be depressed again. With alternative implementations, a spring or biased elastic material may push or pull the key 210 so that it returns to its ready position.

Figure 3:
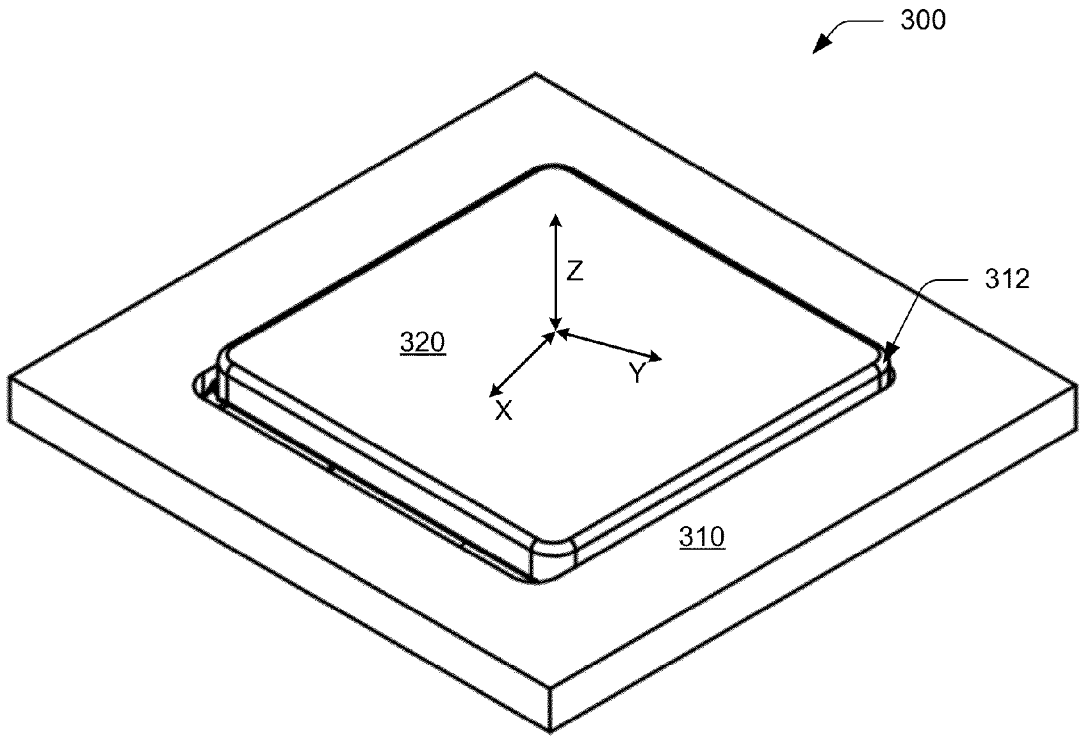
FIG. 3 is an isometric view of a second implementation configured in accordance with the techniques described herein to provide a satisfying tactile user experience of a leveled touchsurface with planar translational responsiveness to vertical travel. The second implementation is an exemplary key assembly in a ready-to-be-pressed position (i.e., ready position), where the depicted exemplary key assembly is configured in accordance with the techniques described herein.

FIG. 3 is an isometric view of another exemplary key assembly 300 configured to implement the techniques described herein to provide a satisfying tactile user experience of a leveled touchsurface with planar translational responsiveness to vertical travel. The key assembly 300 includes a key podium 310 and a key 320. As depicted, the key 320 is shown in its ready position relative to the podium 310. In the ready position, the key 320 sits above the podium 310. Indeed, the key 320 is suspended over and/or at least partially within a keyhole 312 (which is a key-shaped cavity) in the podium 310. The key podium may also be called a keyframe or bezel.

From top to bottom, the key assembly 300 is about 2.5 mm thick. The key podium 310 is about 1.5 mm thick and the key 320 is about 0.75 mm thick. The key 320 is about 19 mm by 19 mm and the keyhole is slight larger at 19 mm by 20 mm. Of course, the dimensions may differ with other implementations.

Each of the double-headed arrows X/Y/Z, as shown in FIG. 3, indicate a direction of a familiar three-dimensional Cartesian coordinate system. Herein, a lateral or planar translation or direction is indicated by the X and Y direction arrows of FIG. 3. In addition, herein, a normal, up, or down movement or direction is consistent with the Z direction arrow as indicated in FIG. 3.

Figure 4:
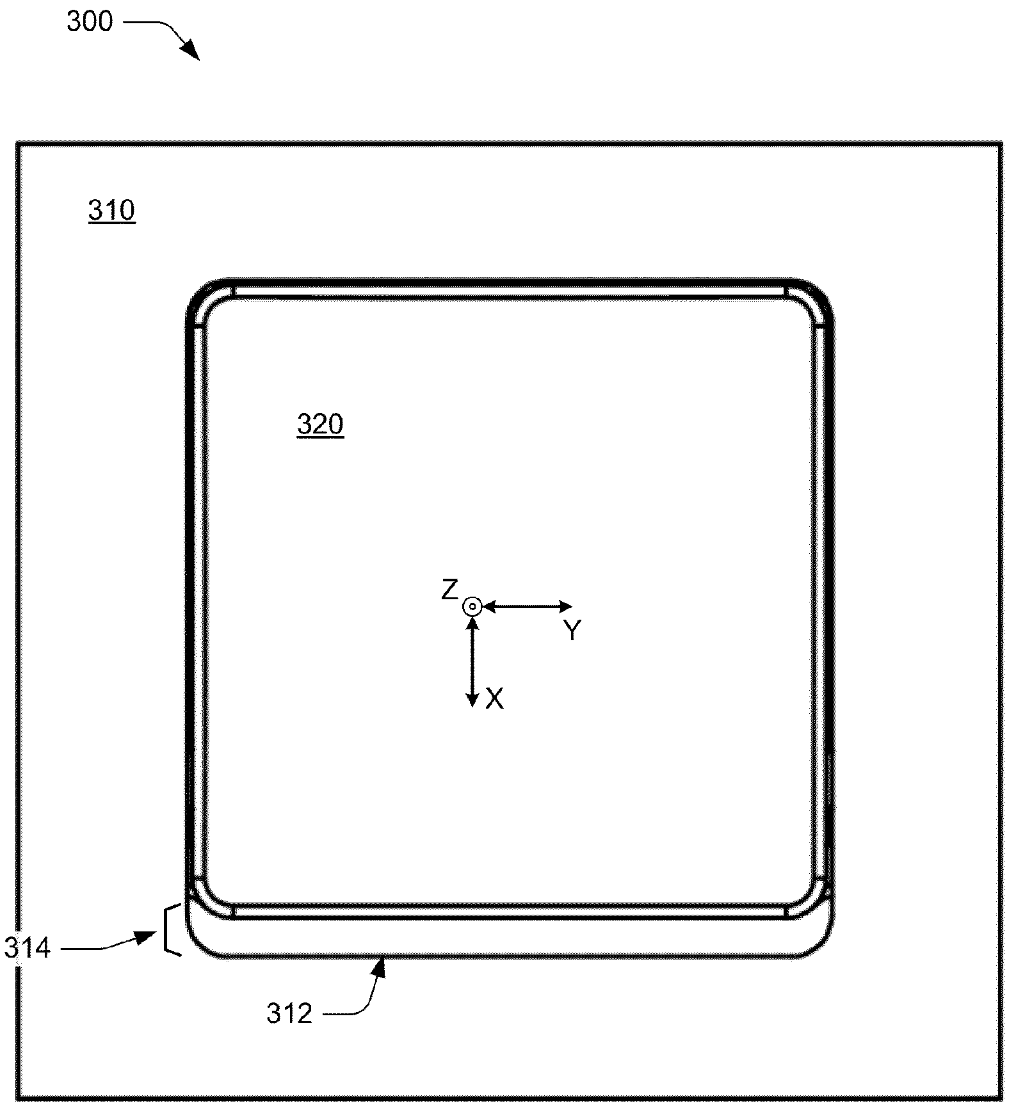
FIG. 4 is top plan view that illustrates the second implementation of the leveled touchsurface with planar translational responsiveness to vertical travel.

FIG. 4 is a top plan view of the key assembly 300 with its podium 310 and key 320. As seen from above, the keyhole 312 fits the key snuggly except for one side where a lateral-movement gap 314 of about 1.0 mm is shown. This gap in the keyhole 312 allows the key 320 space for its lateral travel. In one or more implementations, the dimension of the gap is just sufficient to allow for the planar translation. The X/Y direction arrows are shown and a dotted circle represents the Z direction emanating through the key 320 (e.g., up and down).

Figure 5:
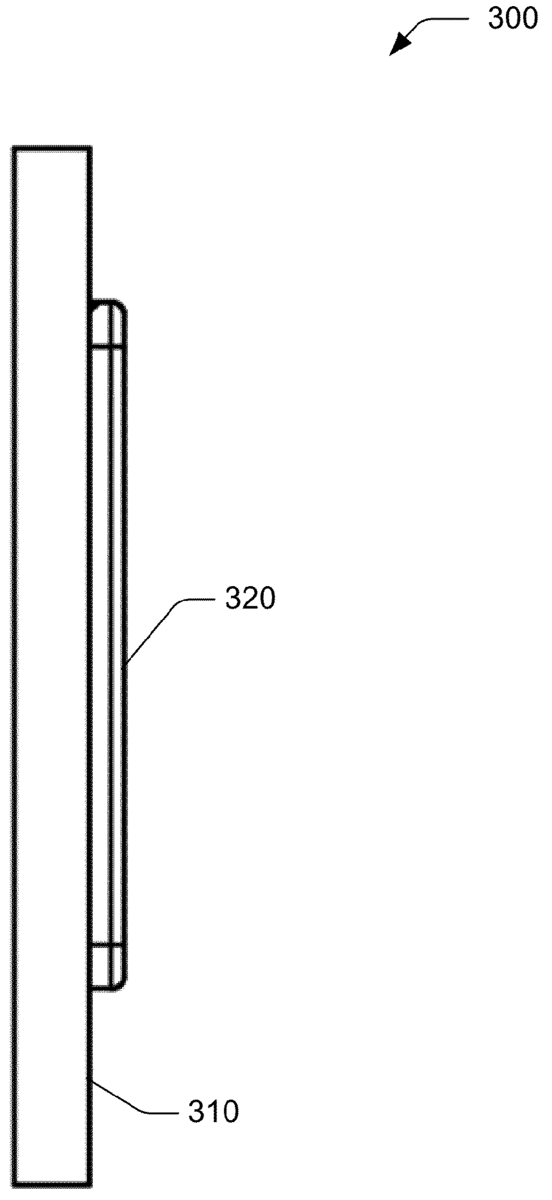
FIG. 5 is a side elevation view that illustrates the second implementation of the leveled touchsurface with planar translational responsiveness to vertical travel.

FIG. 5 is a side elevation view of the key assembly 300 with its podium 310 and key 320.

Figure 6:
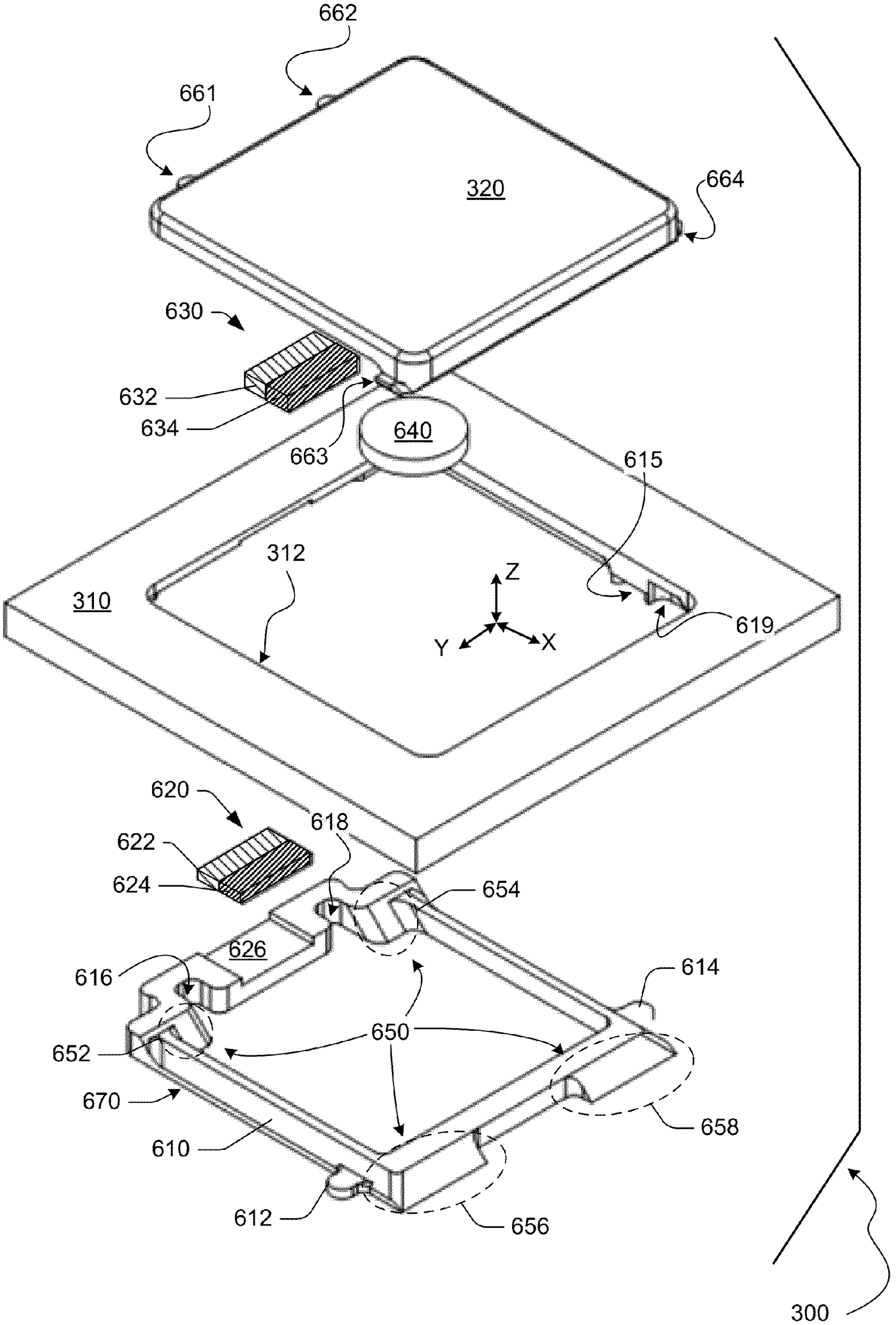
FIG. 6 is an exploded isometric view that illustrates the second implementation of the leveled touchsurface with planar translational responsiveness to vertical travel.

FIG. 6 is an exploded view of the key assembly 300 with its podium 310, key 320, and keyhole 312. This figure reveals a key guide 610, a podium magnet 620, a key magnet 630, and a key hassock (i.e., keypad) 640.

The key guide 610 is designed to fit into (e.g., snap into) and/or under the podium 310. Guide-mounting tabs 612 and 614 of the key guide 610 fit into corresponding tab-receiving cavities in the podium 310. One of such cavities is visible in FIG. 6 at 615.

The podium magnet 620 is mounted into the podium 310 by snugly fitting the magnet into a form-fitting recess 626 formed between the key guide 610 and the key podium 310. As all magnets do, the podium magnet 620 has two poles, which are illustrated as differently shaded sections 622 and 624. The podium magnet 620 is mounted in such a way as to magnetically expose one pole (e.g., 624) to the interior of the keyhole 312.

While only one magnet is shown to be part of the podium magnet 620 in FIG. 6, more than one magnet may be employed. Generally, the one or more podium magnets may be called the "podium-magnet arrangement" since the magnets are located in the podium of the key assembly 300. In other implementations, there may be two, three, or more magnets stacked together in the podium magnet arrangement. Other such implementations may include multiple magnets placed at various positions around the perimeter of the keyhole 312 and at various Z-locations within the keyhole. These various multi-magnet arrangements may impart multiple lateral movements of the key during its downward (or upward) key travel.

While not shown in FIG. 6, the key magnet 630 is snugly mounted/inserted into a form-fitting recess under and/or in the key 320. This key magnet 630, like all magnets, has two poles (632, 634). One pole (632) is magnetically exposed to the interior wall of the keyhole 312 when the key 320 is within and/or over the keyhole 312 (e.g., in the ready position).

While only one magnet is shown to be part of the key magnet 630 in FIG. 6, more than one magnet may be employed. Generally, the one or more key magnets may be called the "key-magnet arrangement" since the magnets are located in the key 320 of the key assembly 300. In other implementations, there may be two, three, or more magnets places at various positions around the perimeter of the key to correspond to one or more magnets of the podium magnet arrangement. These various multi-magnet arrangements may impart multiple lateral movements of the key during its downward (or upward) key travel.

Collectively, the key-magnet arrangement and the podium-magnet arrangement work together to keep the key in and/or return the key to the ready position. Consequently, these magnet arrangements or other implementations that accomplish the same function may be called a ready/return mechanism. In addition, the magnet arrangements offer a degree of resistance to the initial downward force of a keypress. In this way, the magnet arrangements contribute to the satisfactory approximation of a snap-over of a full-travel key of a keyboard. Consequently, these magnet arrangements, or other implementations that accomplish the same function, may be called "one or more mechanisms that simulate the snap-over feel".

The key hassock 640 is attached to the underside of and the center of the key 320. Typically, the hassock 640 has a dual purpose. First, the hassock 640 aids in making a clean and reliable contact with a key switch (which is not shown) at the bottom of a keypress. The hassock 640 provides an unobstructed flat area with a sufficient degree of give (i.e., cushion) to ensure a reliable switch closure of a traditional membrane keyswitch. Second, the hassock 640 provides a predetermined amount of cushioning (or lack thereof) at the bottom of the keypress to provide a satisfactory approximation of a snap-over of a full-travel key of a keyboard.

The key 320 has a set of key-retention tabs 661, 662, 663, 664 that are designed to retain the key into an operable position within and/or over the keyhole 312 (e.g., in the ready position). When the key 320 is placed within and/or over the keyhole 312, the key-mounting tabs 661, 662, 663, 664 fit into corresponding tab-receiving cavities in the formed cavities between the podium 310 and the key guide 610. Portions of three of such cavities are visible in FIG. 6 at 616, 618 and 619. Cavities 616 and 618 are designed to receive key-retention tabs 661 and 662. Cavity 619 is designed to receive key-retention tab 664. Podium 310 forms a ceiling/roof over these cavities and captures the tabs therein. Consequently, the key 320 is likely to stay in position within and/or over the keyhole 312 (e.g., in the ready position).

The key guide 610 has a key-guiding mechanism or structure 650 built therein. The key-guiding mechanism 650 may also be called the leveling/planar-translation-effecting mechanism. The key-guiding mechanism 650 includes key-guiding ramps 652, 654, 656, and 658. These ramps are positioned towards the four corners of the key guide 610. Not shown in FIG. 6, inverse and complementary ramps or chamfered sections (i.e., "chamfers") are built into the underside of key 320.

Working in cooperation together, the key's chamfers slide down the key-guiding ramps during a downward keypress. Regardless of where on the key 320 that a user presses, the chamfer-ramp pairings in each corner keep the key 320 steady and level during a keypress. Therefore, the chamfer-ramp pairings level the key 320. Consequently, the key-guiding mechanism 650 may also be called a leveling structure or mechanism, or just the key leveler.

A structure, such as a guide and rail system, may be used to further limit movement of the key 320 in the X or Y direction and/or rotation about the Z-axis. An arm structure 670 of the key guide 610 functions as a rail system to limit X-direction or Y-direction movement and rotation about the Z-axis.

In general, the purpose of the key leveler is to redistribute an off-center force applied to the key 320 so that the key remains relatively level during its Z-direction travel. That is, the key leveler reduces or eliminates any wobbling, rocking, or tilting of the key during a keypress. In the key assembly 300, the arm structure 670 and the mating key-retention tabs and cavities function, at least in part, to prevent rotation of the key about the Z-axis.

In addition, the chamfer-ramp pairings effectively translate at least some of the user's downward force into lateral force. Thus, the chamfer-ramp pairings convert the Z-direction force of the key 320 into both Z-direction and X/Y direction (i.e., planar or lateral) movement. Since the key-guiding mechanism 650 also translates Z-direction (i.e., vertical) force into X/Y direction (i.e., planar) movement, the key-guiding mechanism 650 may also be called a vertical-to-planar force translator.

Figures 7A, 7B:
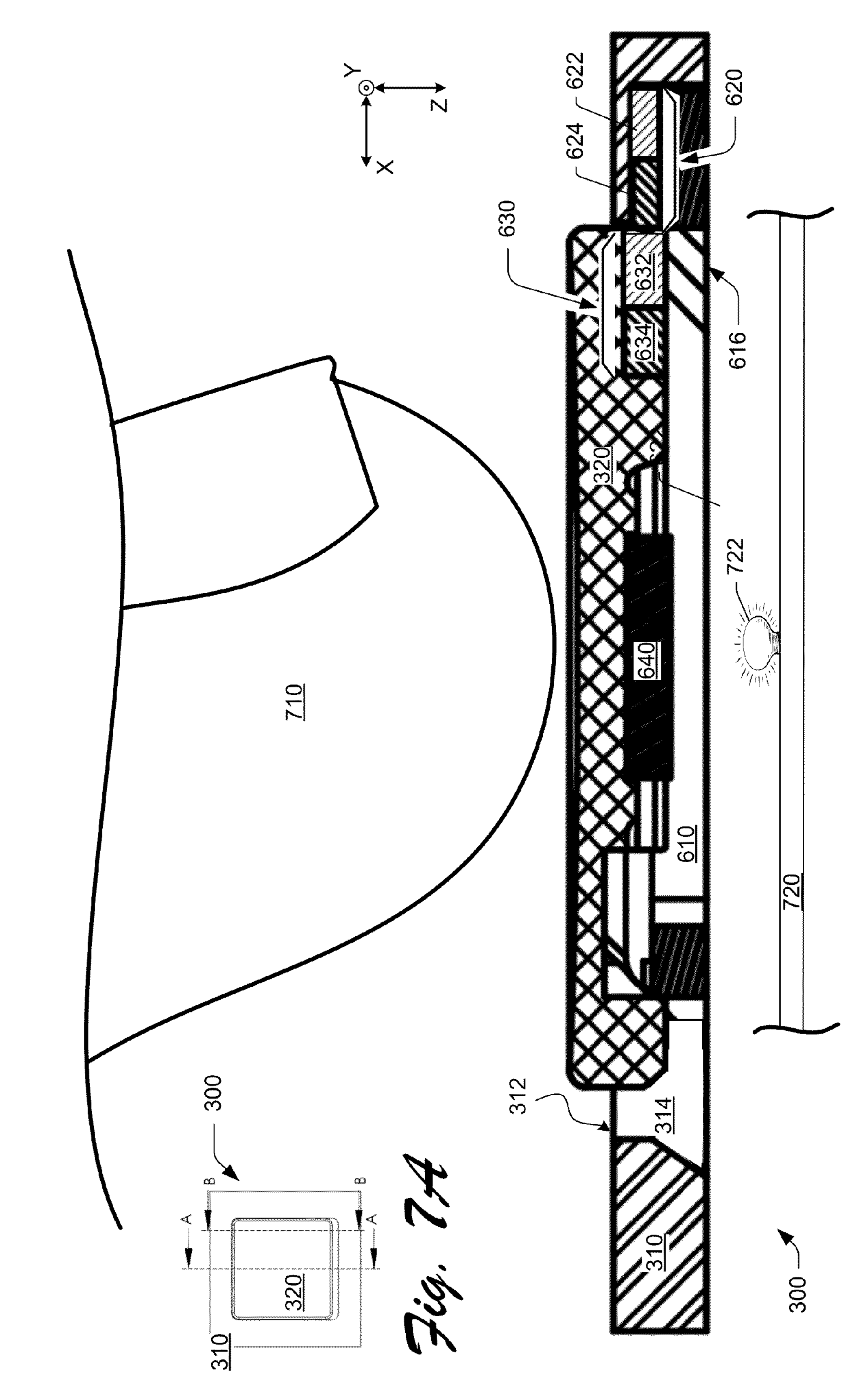
FIGS. 7A and 8A have lines showing where cross-sections are taken for the views shown in FIGS. 7B and 8B. Each of FIGS. 7B and 8B is a cross-sectional view that illustrates the second implementation of the leveled touchsurface with planar translational responsiveness to vertical travel. Line A-A in FIG. 7A shows where the cross-section is taken for the cross-sectional view shown in FIG. 7B. Line B-B in FIG. 8A shows where the cross-section is taken for the cross-sectional view shown in FIG. 8B.
Figure 8A:
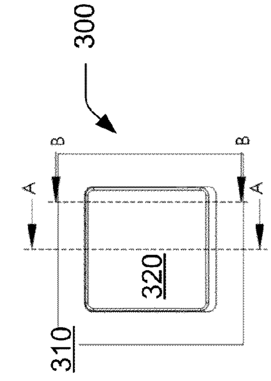
Figure 8B:
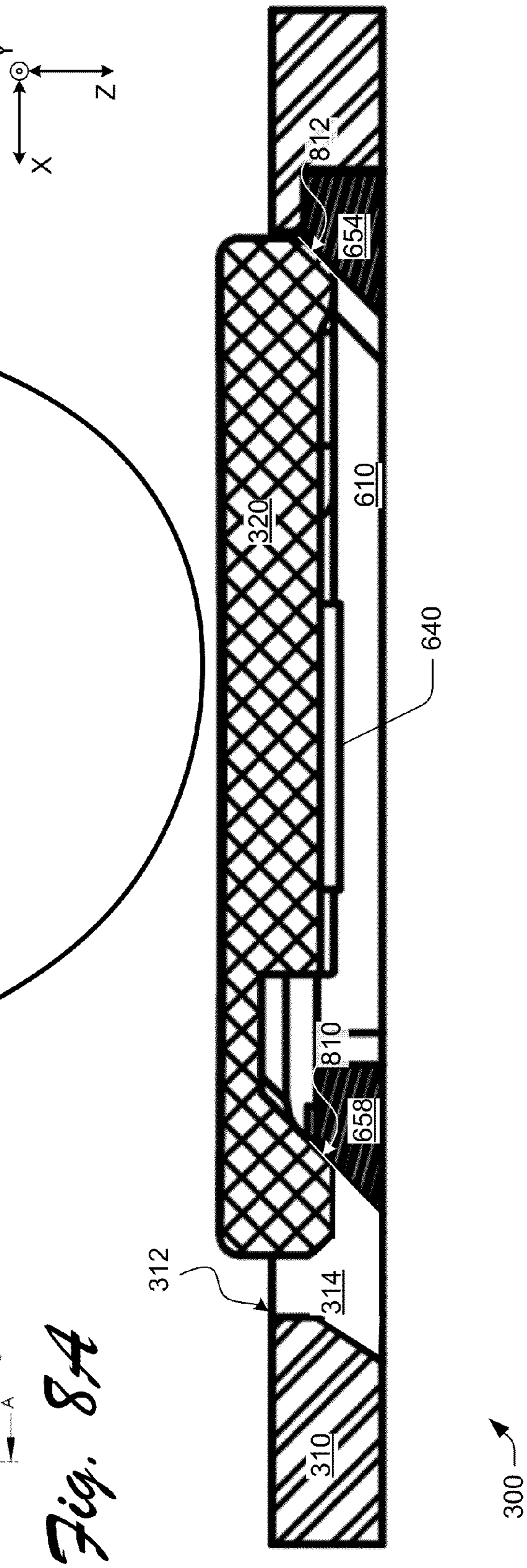

FIGS. 7B and 8B are cross-sectional views of the key assembly 300 with the key 320 shown in its ready position. FIG. 7B shows the cross-section taken at about the center of the key assembly (which is along line A-A as shown in FIG. 7A). FIG. 8B shows the cross-section taken off-center of the key assembly (which is along line B-B as shown in FIG. 8A). For context, in these drawings, a user's finger 710 is shown hovering over the key 320 in anticipation of pressing down on the key.

The vast majority of parts and components of the assembly 300 shown in FIGS. 7A, 7B, 8A, and 8B were introduced in FIG. 6. The cross-sectional view shows the arrangement of those already introduced parts and components.

As depicted in both FIGS. 6 and 7B, the pole of the exposed end 632 of the key magnet 630 is the polar opposite of the exposed end 624 of the podium magnet 620. Because of this arrangement, magnet 630 of the key 320 is attracted towards magnet 620 of the podium 310. Consequently, the magnetic attractive forces hold the key 320 tightly against the podium 310 and in a cantilevered fashion in its ready position. This cantilevered arrangement of the ready position of the key 320 is depicted in at least FIG. 7B.

In addition to the parts and components of the assembly 300 introduced in FIG. 6, FIG. 7B introduces a backlighting system 720 with one or more light emitters 722. The lighting sources of the backlighting system 720, as depicted, can be implemented using any suitable technology. By way of example and not limitation, light sources can be implemented using LEDs, light pipes using LEDs, fiber optic mats, LCD or other displays, and/or electroluminescent panels to name just a few. For example, some keyboards use a sheet/film with light emitters on the side of the sheet/film and light diffusers located under each key.

The backlighting of the keys of a keyboard employing the techniques described herein differs from conventional approach in that there are few if any light-blocking obstructions between the light source (e.g., backlighting system 720) and the key 320. Consequently, the light emanating from below the key 320 reaches the keytop of the key 320 without significant impedance. In conventional approaches, there are typically many obstacles (such as a rubber dome and scissor mechanism) that block the effective and efficient lighting through a keytop.

This can allow, for example, key legends to be illuminated for the user. In the past, backlighting keyboards has proven difficult due to the presence of various actuation structures such as domes and scissor mechanisms which tend to block light.

FIG. 8B shows, in cross-section, two of the chamfers that are built into the underside of key 320. Chamfer 810 is the inverse of and faces the ramp 658 of the key guide 610. Similarly, chamfer 812 is the inverse of and faces the ramp 654 of the key guide 610. When a downward force is imposed upon the key 320 by, for example, finger 710, the key rides the key guide 610 down to the bottom of the keyhole 312. More precisely, the chamfers and ramps working together convert at least some of the downward (i.e., Z-direction) force on the key 320 into a planar or linear (i.e., X/Y-direction) force on the key 320. Consequently, the key 320 moves downward into the keyhole 312 as it also moves linearly into the lateral-movement gap 314.

Alternatively, the key 320 may have pins instead of a chamfer. In that scenario, each pin would ride along the ramp of the key guide 610. Alternatively still, the key guide 610 may have pins (or similar structure) for the chamfers of the key 320 to ride on. With the former alternative scenario, all keys can be the same, saving on design & tooling costs. With the latter alternative scenario, different keys may be produced with chamfers having differing ramp profiles, enabling reconfigurable profiles by swapping out keys.

Figures 9A, 9B:
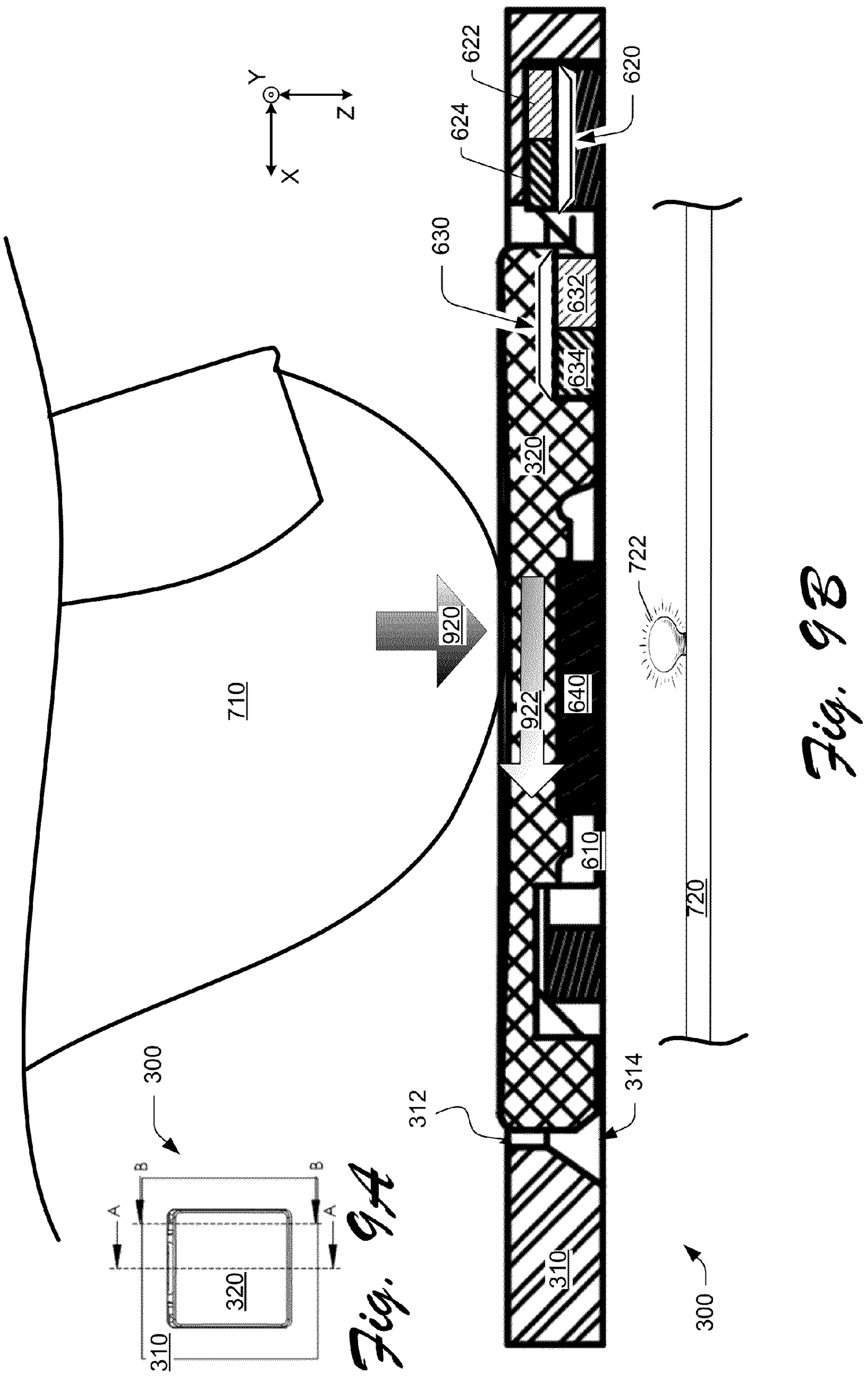
FIGS. 9A and 10A have lines showing where cross-sections are taken for the views shown in FIGS. 9B and 10B. Each of FIGS. 9B and 10B is a cross-sectional view that illustrates the second implementation of the leveled touchsurface with planar translational responsiveness to vertical travel. Line A-A in FIG. 9A shows where the cross-section is taken for the cross-sectional view shown in FIG. 9B. Line B-B in FIG. 10A shows where the cross-section is taken for the cross-sectional view shown in FIG. 10B.
Figures 10A, 10B:
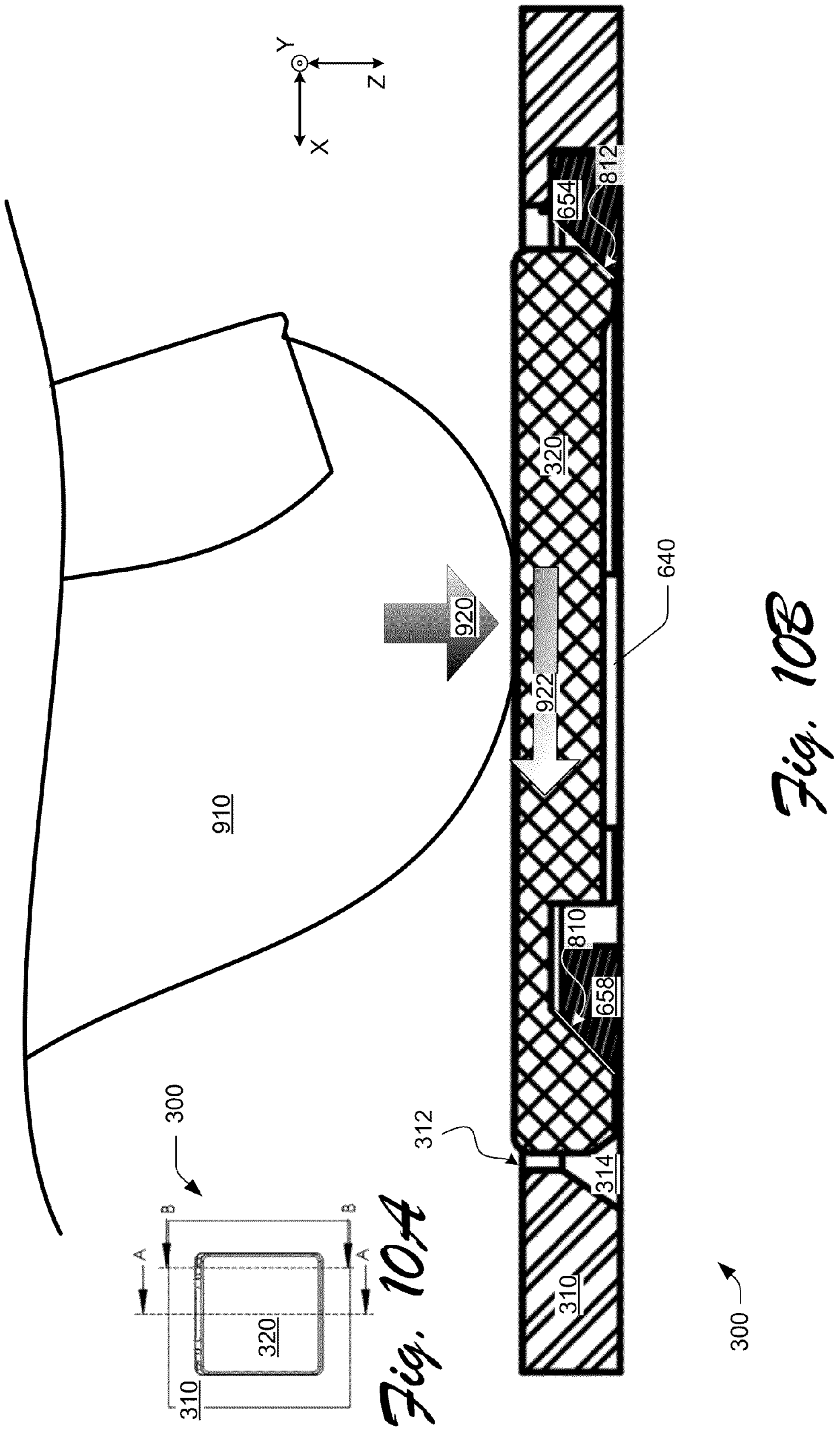

FIGS. 9B and 10B are cross-sectional views of the key assembly 300 with the key 320 shown in a down position after a downward keypress. FIG. 9B shows the cross-section taken about the center of the key assembly (which is along line A-A as shown in FIG. 9A). FIG. 10B shows the cross-section taken off-center of the key assembly (which is along line B-B as shown in FIG. 10A). For context, in these drawings, the user's finger 710 is shown pressing the key 320 down into the keyhole 312.

FIGS. 9A, 9B, 10A, and 10B correspond to FIGS. 7A, 7B, 8A, and 8B, respectively. While FIGS. 7A, 7B, 8A, and 8B show the key 320 in its ready position (where it is positioned over and/or in the keyhole 312) in anticipation of a keypress, FIGS. 9A, 9B, 10A, and 10B show the key 320 at the bottom of a keypress and thus at the bottom of the keyhole 312. For the sake of simplicity, the backlighting system is shown only in FIGS. 7B and 9B.

As shown in FIGS. 9B and 10B, a Z-direction force (as indicated by vector 920) applied by finger 710 onto the key 320 imparts an X/Y-direction force (as indicated by vector 922) on the key, as well. The X/Y-direction (i.e., lateral or planar) force results from the vertical-to-planar force translator, as implemented here by the chamfer-ramp relationships of the key 320 to the key guide 610.

When the user lifts his finger 710 from the key 320, there is no downward force keeping the key in the keyhole 312. The magnetic attraction between the opposite poles (632 and 624) of the key and podium magnets (630 and 620), pulls the key 320 back up the ramps until the key returns to its ready position. That is, without a downward force on the key 320, the key moves from a position depicted in FIGS. 9A, 9B, 10A, and 10B to the ready position depicted in FIGS. 7A, 7B, 8A, and 8B.

As described above, the key guide 610 is fixed under the podium 310 so that the key 320 moves both laterally (X/Y-direction) and vertically (Z-direction) when the user presses the key downward (and when the key returns to its ready-position). Of course, the key 320 rides the ramps (e.g., 652, 654, 656, 658) of the key-guiding mechanism 650 down and up so that the ramps impart the lateral motion to the key.

Alternatively, the key guide 610 may be configured to move laterally while the key 320 is constrained to move substantially vertically. With this alternative scenario, the downward press on the key 320 pushes the key guide 610 to move laterally via the ramps (e.g., 652, 654, 656, 658) of the key guide 610 while the movement of the key is constrained to the vertical. A spring, magnet combination, or similar component returns the key guide 610 to its original position after the key 320 returns to its ready position.

This alternative implementation may be particularly suited in situations where the touchsurface is a touchpad. In that situation, the user may press down on the touchpad to select an on-screen button, icon, action, etc. In response to that, the touchpad translates substantially vertically and pushes a biased guide with the ramps so that it slides in a lateral direction. When sufficient downward force is removed, the bias of the guide urges it back into its original position and pushes the touchpad back up vertically.

Exemplary Ramp Profiles

Figure 11:
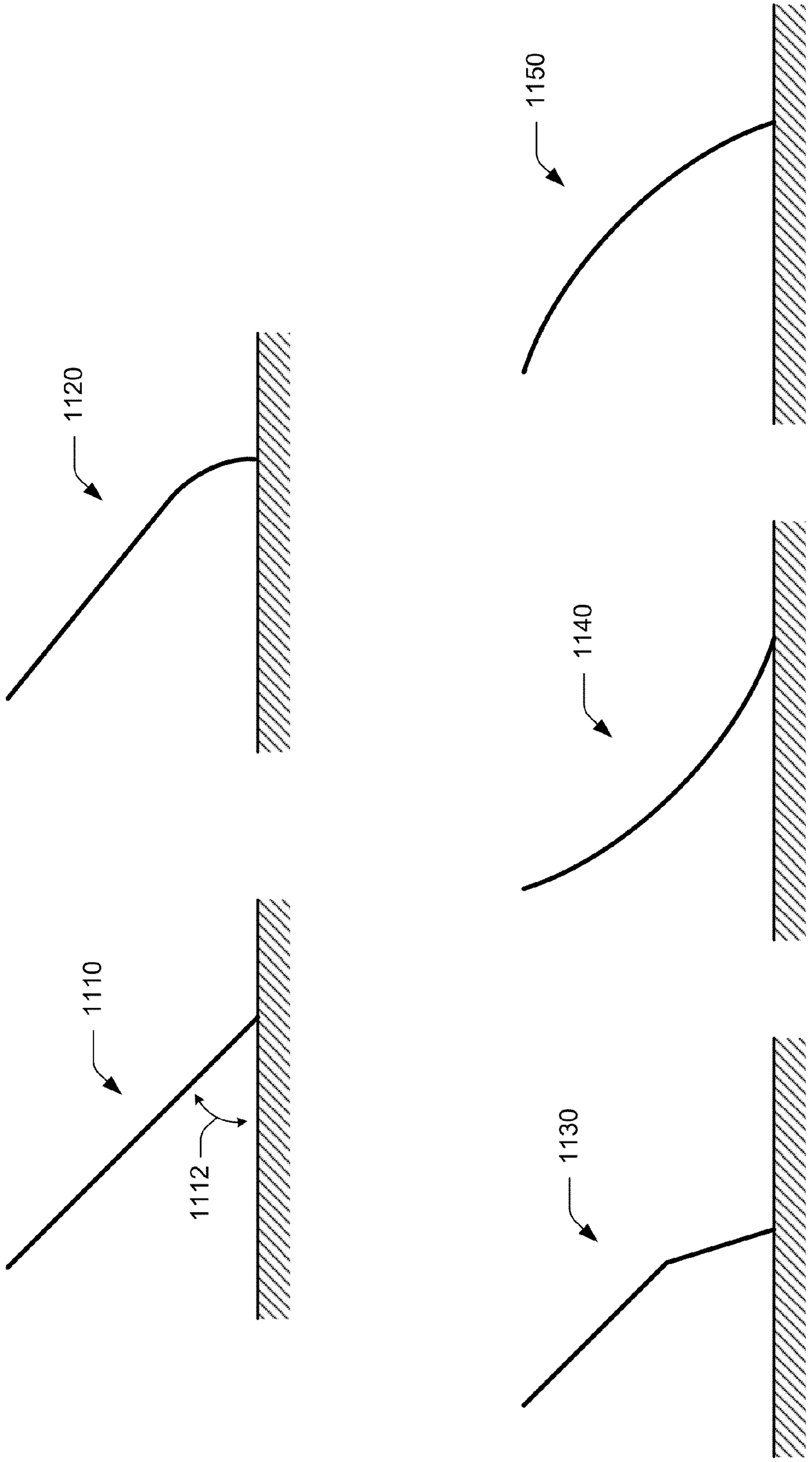
FIG. 11 shows several examples of ramp profiles, which minimally describe the active shape of a mechanism of the implementations that level a touchsurface and impart a planar translation thereto.

FIG. 11 shows various examples of ramp profiles that may be employed in various implementations. Indeed, a single keyboard and a single key may employ different ramp profiles in order to accomplish different feels and/or effects. A ramp profile is the outline or contour of the active surface of the ramps and/or chamfers used for the leveling/planar-translation-effecting mechanisms. Since the key rides on the ramp surface that is described by its profile, the ramp profile informs or describes the motion of the key during its downward-planar translation and its return.

FIG. 11 shows a first exemplary ramp profile 1110 with a single-angle acute slope, a second exemplary ramp profile 1120 with a roll-off slope, a third exemplary ramp profile 1130 with a stepped slope, a fourth exemplary ramp profile 1140 with a scooped slope, and a fifty exemplary ramp profile 1150 with a radius slope.

The first exemplary ramp profile 1110 offers even and steady planar motion throughout the downward travel of the touchsurface. An angle 1112 between a base and the inclined surface of the ramp may be set at between thirty-five and sixty-five degrees, but typically, it may be set to forty-five degrees. The shallower that the angle 1112 is set, the more planar translation is imparted. Of course, if the angle is too shallow, it may be too difficult for a user to move the touchsurface effectively when pressing down on it. Conversely, if the angle 1112 is too steep, the leveling of the key may be compromised.

The second exemplary ramp profile (or roll-over profile) 1120 provides more of a snap or breakaway feel at the rollover portion of the ramp than is felt by the ramp with the first exemplary ramp profile 1110. The feel of a ramp with the third exemplary ramp profile (or stepped profile) 1130 is similar to the feel of the second exemplary ramp profile 1120, but the snap or breakaway feel is more dramatic.

As compared to the feel of a ramp with the first exemplary ramp profile 1110, the feel of a ramp using the fourth exemplary ramp profile (or scooped profile) 1140 is softer and, perhaps, "spongy." The feel of a ramp using the fifth exemplary ramp profile (or radius profile) 1150 is similar to that of the stepped profile 1130 but with a smoother transition. That is, there is less snap to the feel.

The profiles depicted in FIG. 11 are informative of the behavior and/or feel of the planar-translational responsiveness of a touchsurface using such profiles. Of course, there are a multitude of alternative variations and combinations of the profiles depicted. In addition, many alternative profiles differ significantly from the ones depicted.

Exemplary Keyboard

FIGS. 12A-12C offer three different views of an exemplary keyboard 1200 that is configured to implement the techniques described herein. FIG. 12A is an isometric view of the exemplary keyboard 1200. FIG. 12B is top plan view of the exemplary keyboard 1200. FIG. 12C is a side elevation view of the exemplary keyboard 1200. As depicted, the exemplary keyboard 1200 has a housing 1202 and an array of keys 1204.

As can be seen by viewing the exemplary keyboard 1200 from the three points of view offered by FIGS. 12A-12C, the exemplary keyboard is exceptionally thin (i.e., low-profile) in contrast with a keyboard having conventional full-travel keys. A conventional keyboard is typically 12-30 mm thick (measured from the bottom of the keyboard housing to the top of the keycaps). Examples of such keyboards can be seen in the drawings of U.S. Pat. Nos. D278,239, D292,801, D284,574, D527,004, and D312,623. Unlike these traditional keyboards, the exemplary keyboard 1200 has a thickness 1206 that is less than 4.0 mm thick (measured from the bottom of the keyboard housing to the top of the keycaps). With other implementations, the keyboard may be less than 3.0 mm or even 2.0 mm.

The exemplary keyboard 1200 may employ a conventional keyswitch matrix under the keys 1204 that is arranged to signal a keypress when the user presses its associated key down firmly. Alternatively, the exemplary keyboard 1200 may employ a new and non-conventional keyswitch matrix.

The exemplary keyboard 1200 is a stand-alone keyboard rather than one integrated with a computer, like the keyboards of a laptop computer. Of course, alternative implementations may have a keyboard integrated within the housing or chassis of the computer or other device components. The following are examples of devices and systems that may use or include a keyboard like the exemplary keyboard 1200 (by way of example only and not limitation): a mobile phone, electronic book, computer, laptop, tablet computer, stand-alone keyboard, input device, an accessory (such a tablet case with a build-in keyboard), monitor, electronic kiosk, gaming device, automated teller machine (ATM), vehicle dashboard, control panel, medical workstation, and industrial workstation.

In a conventional laptop computer, the keyboard is integrated into the device itself. The keys of the keyboard typically protrude through the housing of the laptop. To avoid unnecessary wear and tear on the mechanical components of the keyboard while the screen/lid of the keyboard is closed, the keys of a conventional laptop are typically recessed into a so-called keyboard trough. Unfortunately, the mechanics of a keyboard are particularly susceptible to liquid contaminates (e.g., spilled coffee) because liquid naturally flows into depressions, like the keyboard trough. Therefore, the keyboard troughs of a conventional laptop contribute to infiltration of liquid contaminates into its keyboard mechanisms.

Unlike the keyboard of a conventional laptop, a keyboard employing the techniques described herein need not be placed in a contaminate-collecting depression like the keyboard trough. As shown by the exemplary keyboard 1200 in FIG. 12, the keys 1204 are not located in a depression or trough. Indeed, the exemplary keyboard 1200 may be integrated with a laptop with a mechanism that drops the keys 1204 into their respective keyholes when the lid of the laptop is closed. Such mechanism may include a tether that pulls each key from its ready position into its keyhole. Alternatively, such a mechanism may involve shifting or moving of the podium magnets of each key so that such magnet no longer retains the key. Consequently, each key will drop into their respective keyholes.

Doing this produces no undue mechanical wear and tear on keys. Unlike the conventional approaches, the exemplary keyboard 1200 has no parts that would lose their spring, bias, or elasticity because of prolonged misuse. Similarly, the magnets of the keys 1204 will not lose their magnetic ability by being depressed into their keyholes. When the screen/lid is lifted, the keys 1204 snap up into their ready position as soon as the tension of the tether is released and/or the podium magnet is restored to its original position.

Other Exemplary Key Assemblies

Figure 13:
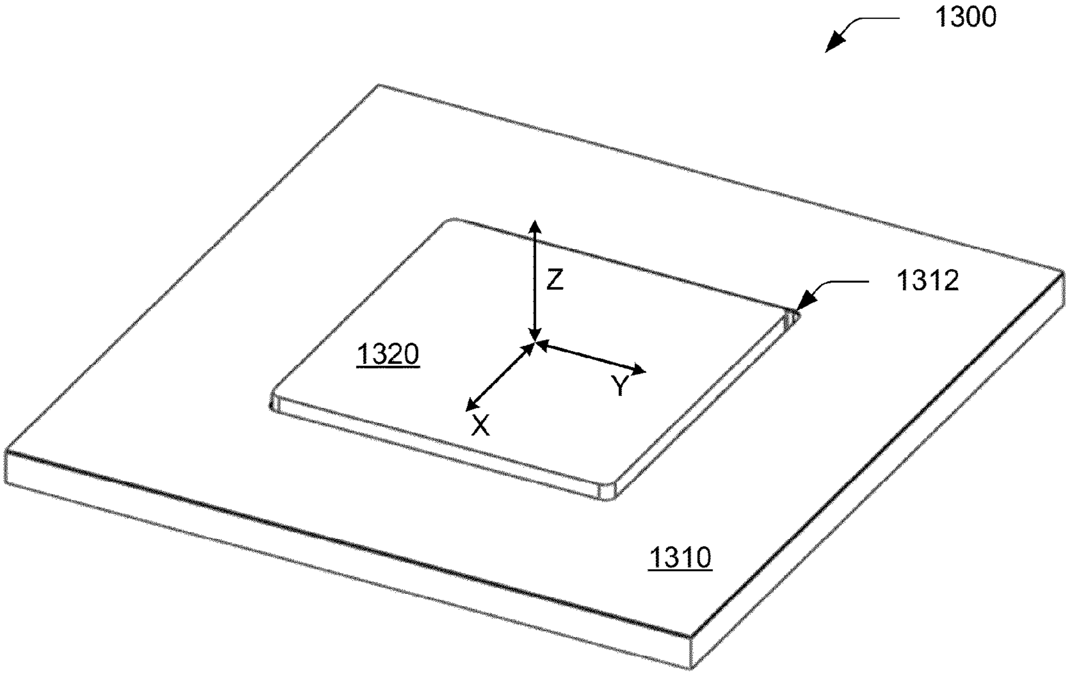
FIG. 13 is an isometric view of a third implementation configured in accordance with the techniques described herein to provide a satisfying tactile user experience of a leveled touchsurface with planar translational responsiveness to vertical travel. The third implementation is an exemplary key assembly in a ready-to-be-pressed position (i.e., ready position), where the depicted exemplary key assembly is configured in accordance with the techniques described herein.

FIG. 13 is an isometric view of still another exemplary key assembly 1300 configured to implement the techniques described herein to provide a satisfying tactile user experience using passive tactile response. The key assembly 1300 includes a key podium 1310 and a key 1320. Notice that the key 1320 sits above the podium 1300. Indeed, the key 1320 is suspended over (and/or partially in) a key-shaped hole 1312 ("keyhole") in the podium 1310. The key podium may also be called a keyframe or bezel.

From top to bottom, the key assembly 1300 is about 2.5 mm thick. The key podium 1310 is about 1.5 mm thick and the key 1320 is about 0.75 mm thick. The key 1320 is about 19 mm by 19 mm and the keyhole is slightly larger at 19 mm by 20 mm. Of course, the dimensions may differ with other implementations.

Figure 14:
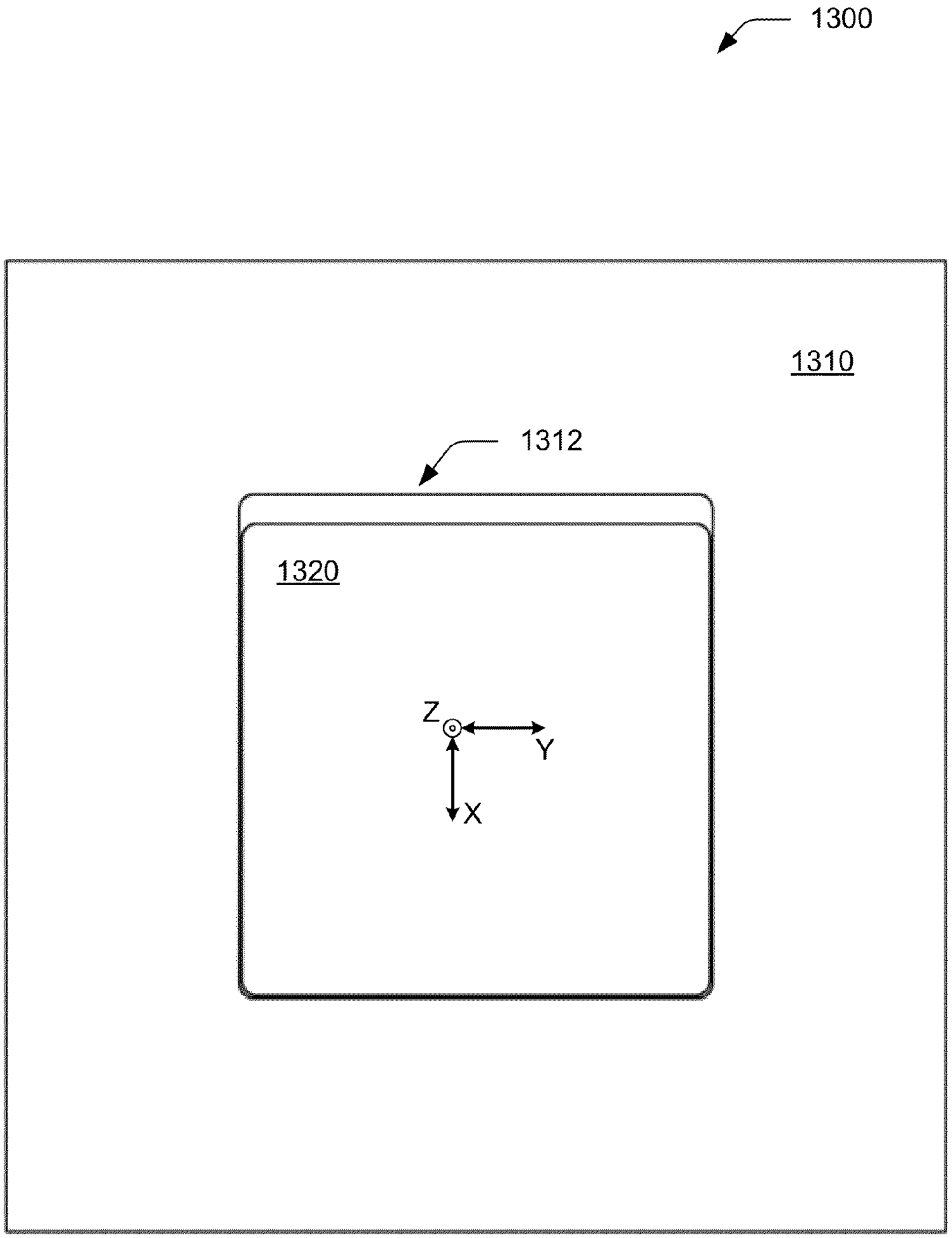
FIG. 14 is top plan view that illustrates the third implementation of the leveled touchsurface with planar translational responsiveness to vertical travel.

FIG. 14 is a top plan view of the key assembly 1300 with its podium 1310 and key 1320. As seen from above, the key-shaped hole 1312 fits the key snuggly except for one side where a gap of about 1.0 mm is left. This gap in the keyhole 1312 allows the key 1310 room for its lateral travel. The X/Y direction arrows are shown and a dotted circle represents the Z direction emanating through the key 1320 (e.g., up and down).

Figure 15:
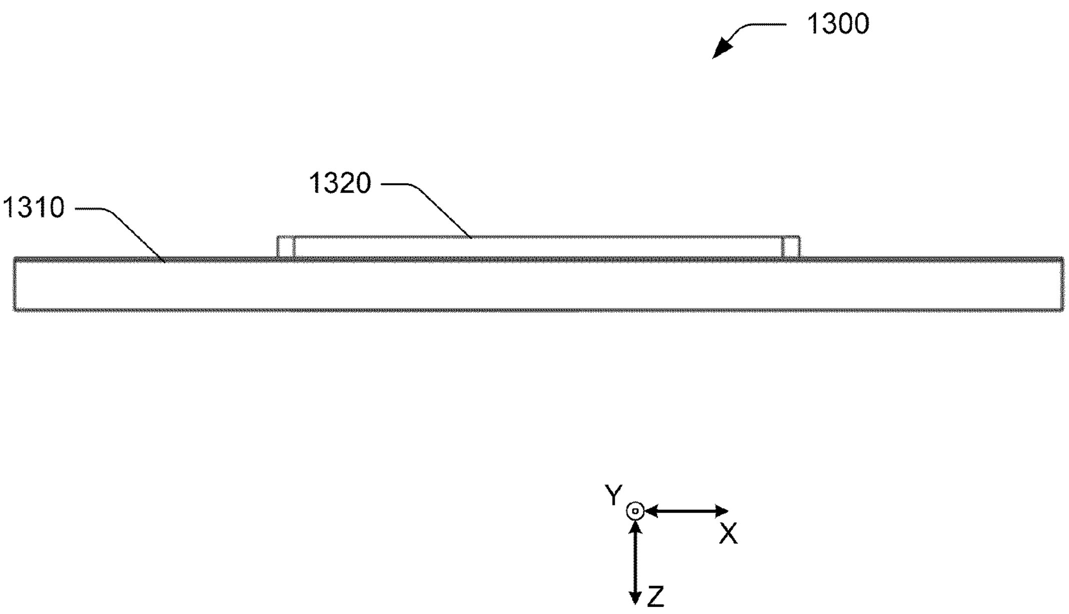
FIG. 15 is a side elevation view that illustrates the third implementation of the leveled touchsurface with planar translational responsiveness to vertical travel.

FIG. 15 is a side elevation view of the key assembly 1300 with its podium 1310 and key 1320.

Figure 16:
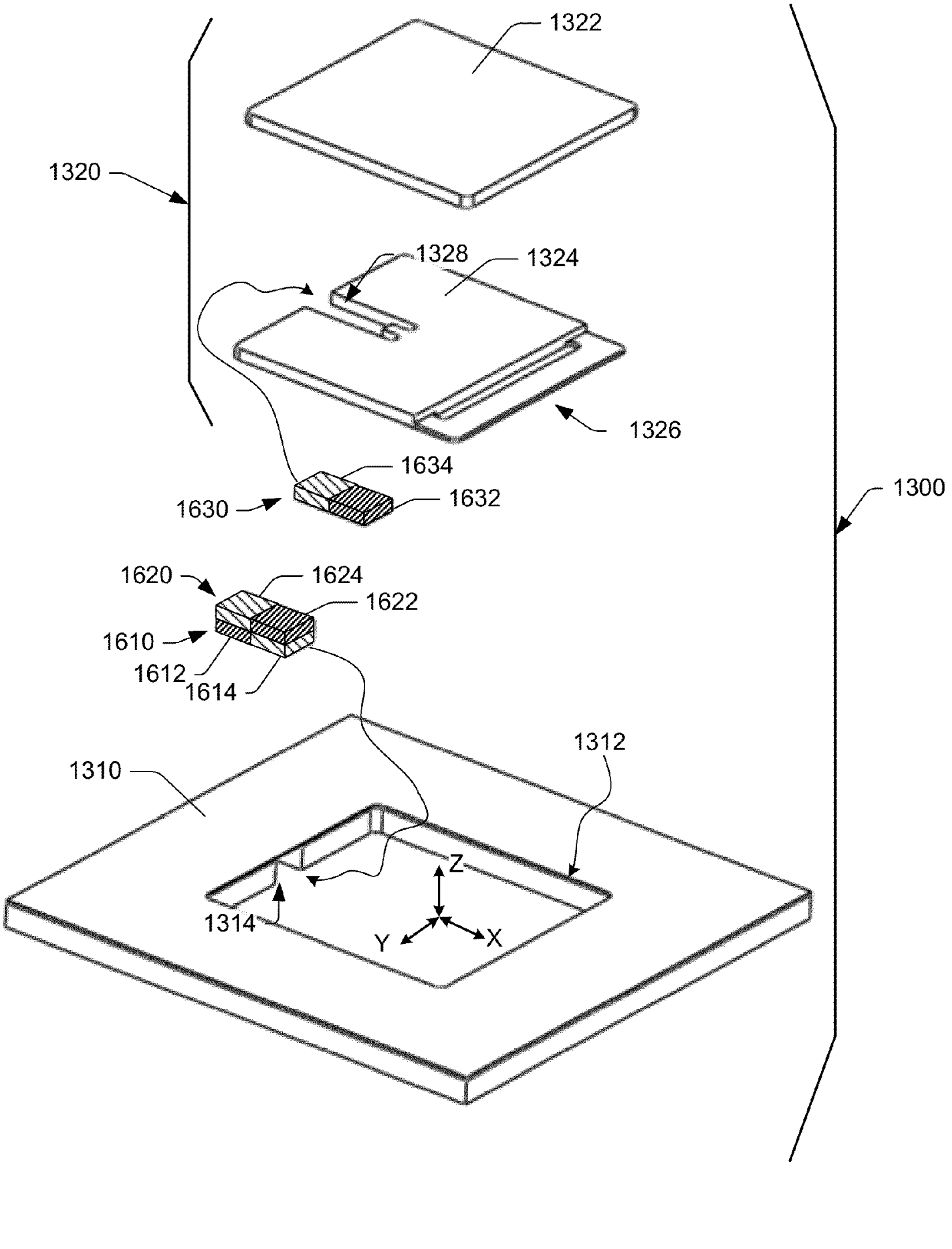
FIG. 16 is an exploded isometric view that illustrates the third implementation of the leveled touchsurface with planar translational responsiveness to vertical travel.

FIG. 16 is an exploded view of the key assembly 1300 with its podium 1310 and key 1320.

Figure 17:
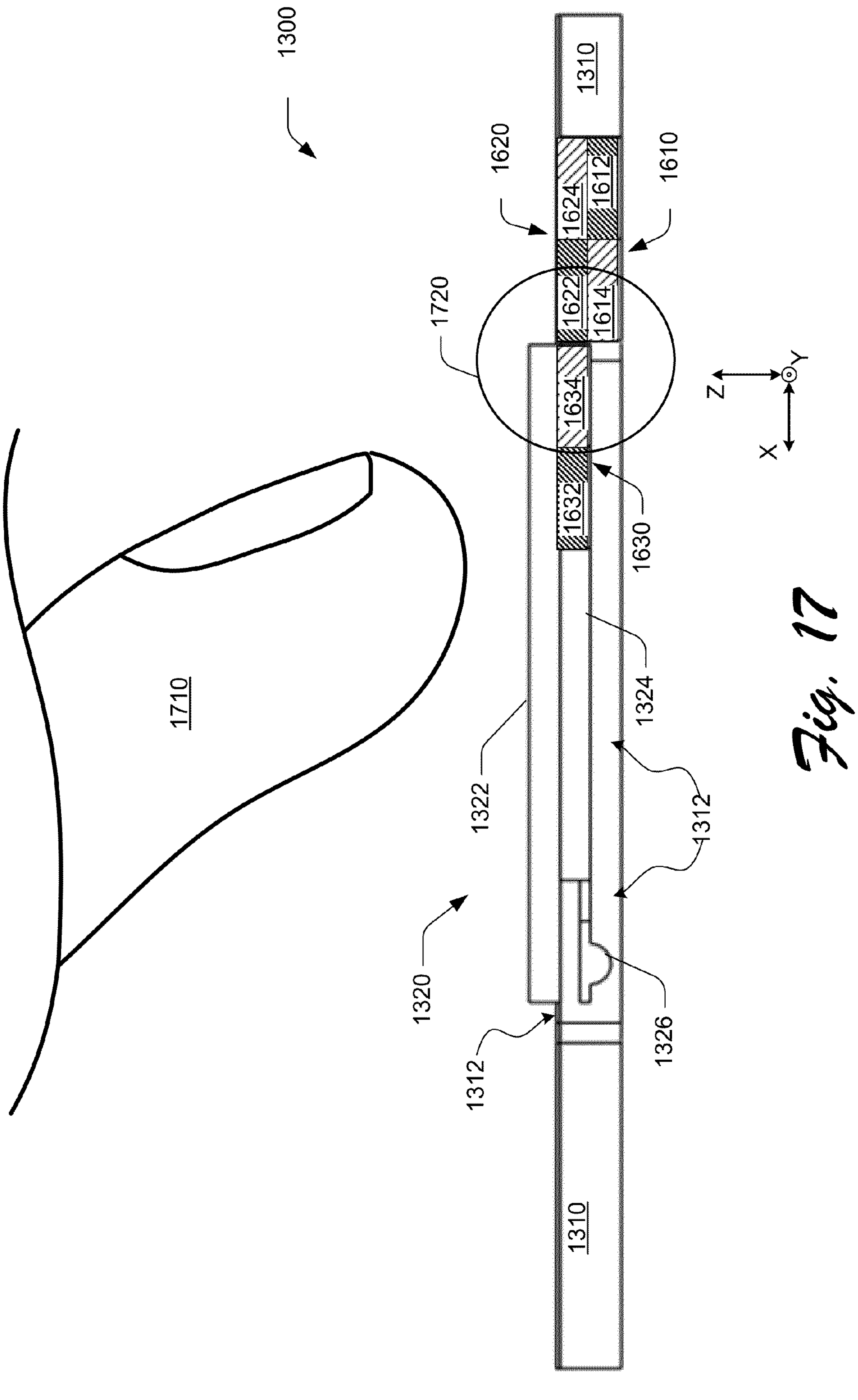
FIG. 17 is a cross-sectional view that illustrates the third implementation of the leveled touchsurface with planar translational responsiveness to vertical travel.

FIG. 17 is a cross-section of the key assembly 1300, with the cross-section being taken at about the center of the key assembly. For context, a user's finger 1710 is shown hovering over the key 1320 in anticipation of pressing down on the key.

The views of FIGS. 16 and 17 show three magnets (1610, 1620, 1630) which were not exposed in the previous views of the assembly 1300. Magnets 1610 and 1620 are stacked together and snugly mounted/inserted into a form-fitting recess 1314 of the key podium 1310. As depicted in both FIGS. 16 and 17, the magnet 1620 is stacked atop the magnet 1610 with the poles of one magnet (1622, 1624) directly over the opposite poles (1612, 1614). This arrangement is used, of course, because the opposite poles of magnets are attracted towards each other.

The podium magnets are mounted into the podium 1310 so as to magnetically expose one pole (e.g., 1622) of the upper magnet 1620 and an opposite pole (e.g., 1614) of the lower magnet 1610 of the magnet stack to the interior of the keyhole 1312.

Collectively, the two magnets 1610 and 1620 may be called the "podium magnet arrangement" since the magnets are located in the podium of the key assembly 1300. While this implementation uses two magnets for the podium magnet arrangement, an alternative implementation may employ just one magnet. In that implementation, the single magnet would be arranged vertically so that both poles are magnetically exposed to the interior of the keyhole.

In still other implementations, there may be more than just two magnets in the podium magnet arrangement. One such implementation may include three or more magnets in a stack. Other such implementations may include multiple magnets placed at various positions around the perimeter of the keyhole 1312 and at various Z-locations within the keyhole. These various multi-magnet arrangements may impart multiple lateral movements of the key during its downward (or upward) key travel.

As depicted in both FIGS. 16 and 17, the key 1320 includes a keycap 1322 and keybase 1324. The key base 1324 includes a key leveler 1326. In some implementations, the key leveler 1326 may be a biased. The purpose of the key leveler 1326 is to redistribute an off-center force applied to the key so that the key remains relatively level during its Z-direction travel. Of course, other leveling mechanisms and approaches may be employed in alternative implementations. In one alternative, the other magnets may be distributed around the periphery of the keyhole 1312 to hold the key 1320 and breakaway evenly in response to a downward force.

A key magnet 1630 is snugly mounted/inserted into a form-fitting recess 1328 of the key base 1324. The recess 1328 is shown in FIG. 16. This key magnet 1630, like all magnets, has two poles (1632, 1634). One pole (1634) is magnetically exposed to the interior walls of the keyhole 1312.

For the purpose of the planar-translation-responsiveness-to-vertical-travel technology described herein, the pole of the exposed end of the key magnet is the opposite of the exposed end of the top magnet of the podium magnet arrangement. As depicted in both FIGS. 16 and 17, pole 1634 of the key magnet 1630 is the opposite of pole 1622 of the top magnet 1620 of the podium magnet arrangement. Because of this arrangement, magnet 1630 of the key 1320 is attracted towards magnet 1620 of the podium 1310. Consequently, the magnetic attractive forces hold the key 1320 tightly against the podium 1310 and in a cantilevered fashion over and/or partially in the keyhole 1312. This cantilevered arrangement is best depicted in FIG. 17.

Collectively, the key-magnet arrangement and the podium-magnet arrangement work together to keep the key in and return the key to the ready position. Consequently, these magnet arrangements or other implementations that accomplish the same function may be called a ready/return mechanism. In addition, the magnet arrangements offer a degree of resistance to the initial downward force of a keypress. In this way, the magnet arrangements contribute to the satisfactory approximation of a snap-over of a full-travel key of a keyboard. Consequently, these magnet arrangements, or other implementations that accomplish the same function, may be called "one or more mechanisms that simulate the snap-over feel".

Figure 18A:
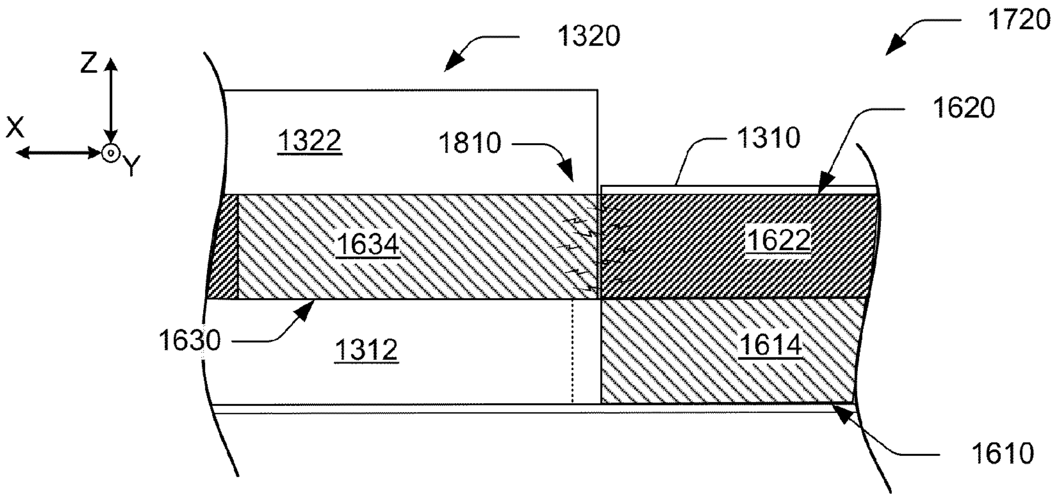
FIGS. 18A and 18B show a cut-away portion of the third implementation as circled in FIG. 17.
Figure 18B:
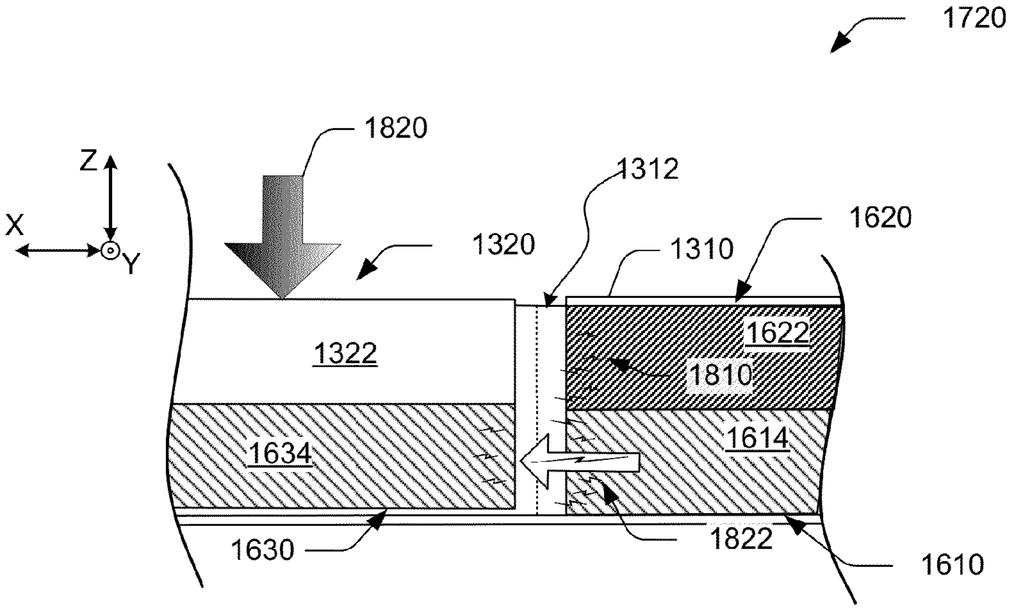

FIGS. 18A and 18B show a cut-away portion 1720 as circled in FIG. 17. FIG. 18A shows the components of the key assembly 1300 just as they were arranged in FIG. 17. The key 1320 is operatively associated (e.g., connected, coupled, linked, etc.) via magnetic attraction to the key podium 1310. An attraction 1810 between the opposite poles (1634, 1622) of the key magnet 1630 and the top podium magnet 1620 is indicated by a collection of bolt symbols (↯) therebetween.

FIG. 18B shows the same components of the assembly 1300 but after a downward force (represented by a vector 1820) imparted on the key 1320 by a user's finger. The downward force breaks the attraction 1810 between the key magnet 1630 and the top podium magnet 1620. The amount of downward force necessary to break the magnetically coupling can be customized based upon the size, type, shape, and positioning of the magnets involved. Typically, breakaway force ranges from forty to a hundred grams.

As the key 1320 travels downward (which is a Z-direction), it is also pushed laterally by a magnetic repulsive force between the like poles (1634, 1614) of the key magnet 1630 and lower podium magnet 1610. The repulsion 1822 between the magnets is represented in FIG. 18*b* by an arrow and a collection of bolt symbols (↯).

With this arrangement, the user's experience of a keypress is similar to the feel of a snap-over as described in U.S. Provisional Patent Application Ser. No. 61/429,749, filed on Jan. 4, 2011 (which is incorporated herein by reference). During the keypress, the release of the key 1320 from the magnetic hold is like the breakover point, which is the feel of when a rubber dome of a conventional rubber-dome key collapses.

The sidewalls of the keyhole 1312 act as guide to the key 1320 during the key's Z-direction travel (e.g., down and/or up). The distal end of the keyhole 1312 is away from the wall with the podium magnets mounted therein. There is additional space in the distal end of the keyhole 1312 that allows the key 1320 to travel laterally during its downward travel of a keypress. The key leveler 1326 may touch or hit the wall of the distal end of the keyhole 1312. Alternatively, a key guide system similar to that described in a previous implementation (which was key assembly 300) can be used to aid in key leveling and lateral displacement.

Figure 19:
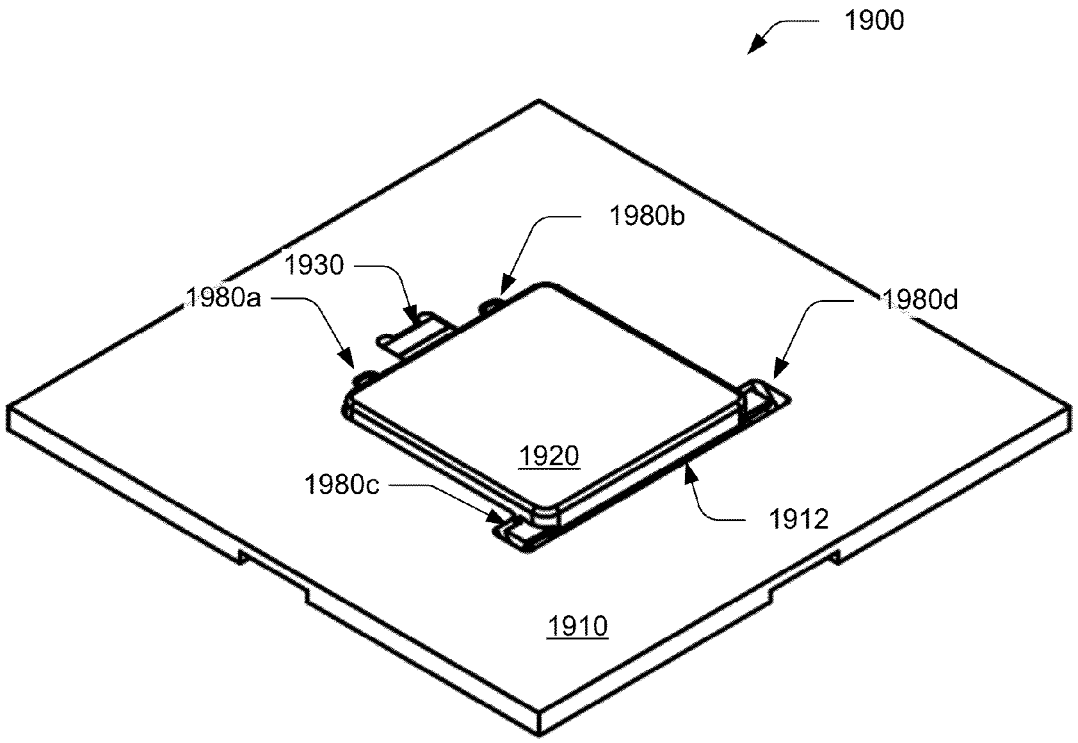
FIG. 19 is an isometric view of a fourth implementation configured in accordance with the techniques described herein to provide a satisfying tactile user experience of a leveled touchsurface with planar translational responsiveness to vertical travel. The fourth implementation is an exemplary key assembly in its fully depressed position, where the depicted exemplary key assembly is configured in accordance with the techniques described herein.

FIG. 19 is an isometric view of still another exemplary key assembly 1900 configured to implement the techniques described herein to provide a satisfying tactile user experience using passive tactile response. The key assembly 1900 includes a key podium 1910 and a key 1920. The key 1920 is suspended over (and/or partially in) a key-shaped hole 1912 ("keyhole") in the podium 1910. The key podium may also be called a keyframe or bezel.

Figure 20:
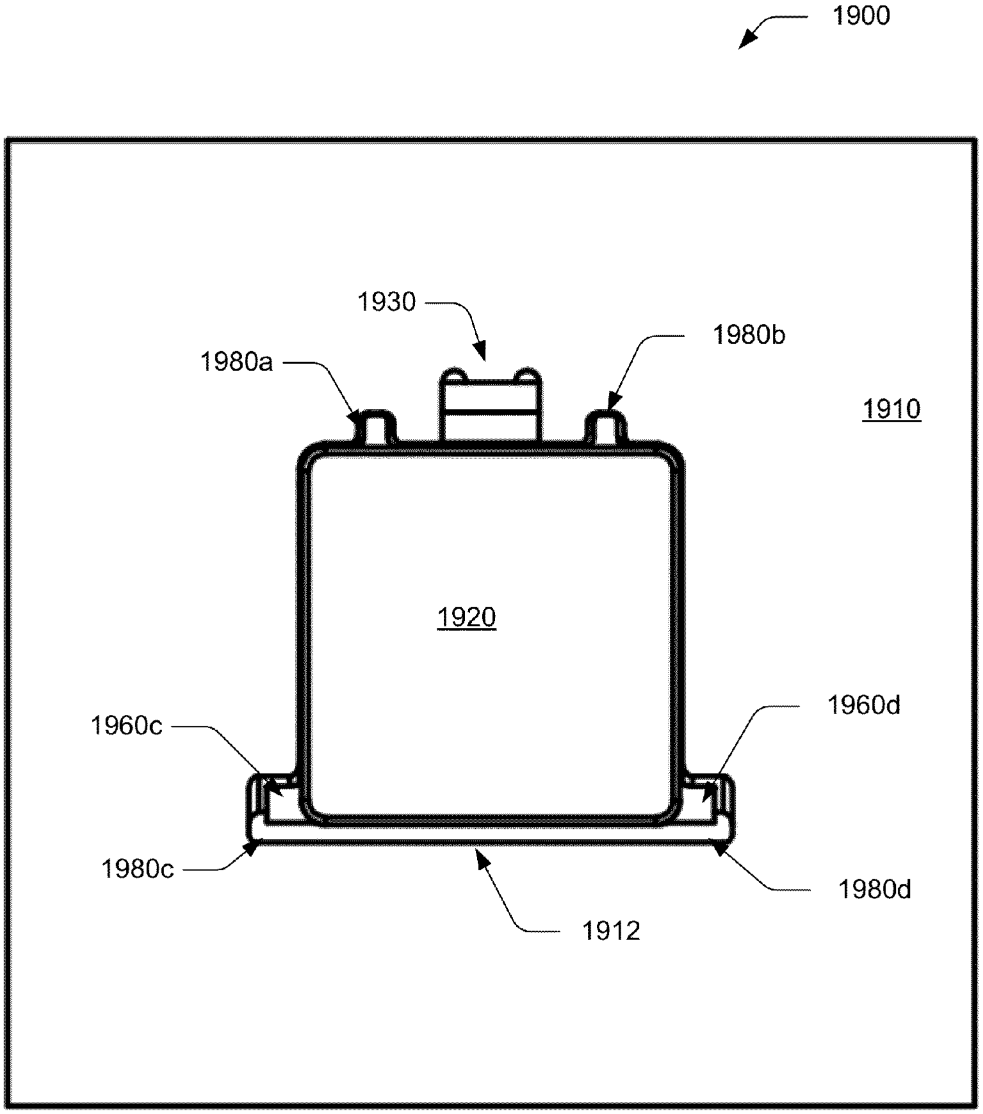
FIG. 20 is top plan view that illustrates the fourth implementation of the leveled touchsurface with planar translational responsiveness to vertical travel.

FIG. 20 is a top plan view of the exemplary key assembly 1900, with the same key podium 1910 and key 1920.

Figure 21:
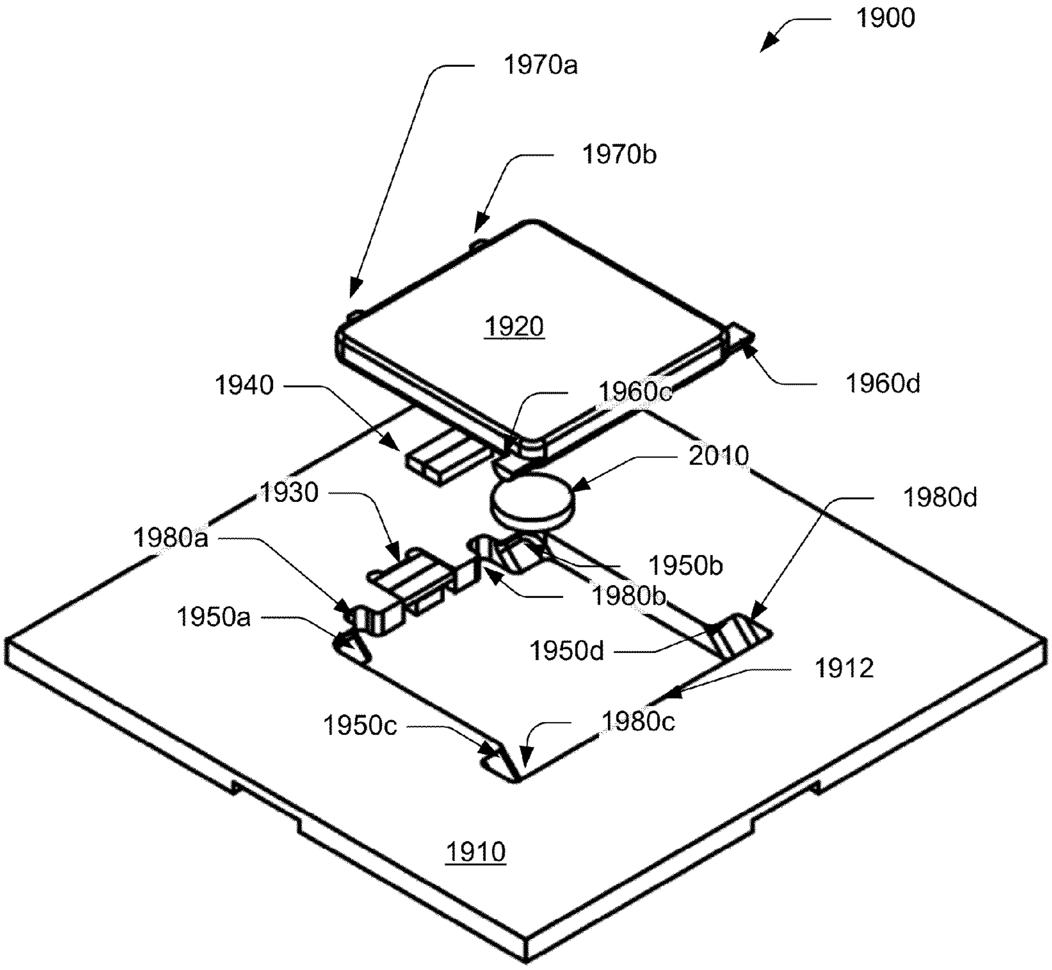
FIG. 21 is an exploded isometric view that illustrates the fourth implementation of the leveled touchsurface with planar translational responsiveness to vertical travel.

FIG. 21 is an exploded view of the exemplary key assembly 1900, with the same key podium 1910 and key 1920. Also, shown in FIG. 21 is a key hassock 2010.

As shown in FIGS. 19-21, this key assembly 1900 differs from the key assembly 1300 (shown in FIGS. 13-18) in the arrangements of the magnets and the inclusion of structures, with a key and podium that are designed to impart lateral force onto the key and to provide leveling to the key.

The podium magnet arrangement of key assembly 1900 includes two or more stacked magnets with poles of each magnet alternating. With this assembly 1900, the podium magnet arrangement includes one single magnet 1930. The single, non-stacked magnet arrangement can be seen best in FIG. 21. This sole magnet is placed horizontally so that only one pole is exposed into the keyhole 1912. Like the assembly 1900, the exposed pole of magnet 1930 is opposite of (and thus magnetically attracted to) the exposed pole of the key magnet 1940 (shown in FIG. 21).

As seen in FIGS. 20 and 21, the podium 1910 has a ramp or inclined plane (1980*a*, 1980*b*, 1980*c*, 1980*d*) built into each corner of the keyhole 1912. Inverse and complementary ramps or chamfers are built into the key 1920. Two such complementary ramps (1960*c* and 1960*d*) are seen in FIGS. 20 and 21.

Working in cooperation together, the key's ramps slide down the podium's ramps during a downward keypress. Regardless of where on the key 1920 that a user presses, the ramp-pairings in each corner keep the key 1920 steady and level during a keypress. Therefore, the ramp-pairing levels the key 1920.

In addition, the ramp-pairings effectively translate at least some of the user's downward force into lateral force. Thus, the ramp-pairings convert the Z-direction movement of the key 1920 into both Z-direction and lateral direction movement. Because of this, the repulsive magnetic force of the lower podium magnet of the key assembly 1900 is not required to impart a lateral force onto the key. Thus, unlike key assembly 1300, there is no lower podium magnet used in the key assembly 1900. However, alternative implementations may employ a lower podium magnet to aid the ramps with the planar-translation effecting action.

In addition, there is an additional structural aspect found in this key assembly 1900, but not found in implementations already discussed herein. The key has four flanges or protuberances, two of which are labeled 1980*a* and 1980*b* and are best seen in FIG. 20. The other two protuberances are labeled 1960*c* and 1960*d* and are best seen in FIGS. 19 and 20. Because these protuberances have two of the key's ramps on them, these protuberances were previously introduced and labeled as ramps. Herein, the labels 1960*c* and 1960*d* refer to a common structure, but that structure may be described as performing different functions.

As seen in FIGS. 19, 20, and 21, the podium 1910 has four protuberance-receiving recesses 1980*a*, 1980*b*, 1980*c*, and 1980*d* formed from part of the walls of the keyhole 1912. As their names suggest, each of these recesses 1980*a*, 1980*b*, 1980*c*, and 1980*d* are configured to receive a corresponding one of the key's protuberances. FIGS. 19-21 show the magnetically coupled key 1920 with its protuberances fitted into their corresponding recesses.

In this arrangement, a finishing layer (not shown) may be extended over the podium 1910 and over the recesses so as to trap the protuberances underneath. In this way, a finishing layer would retain the key 1920 in its position suspended over and/or within the keyhole 1912. The finishing layer may be made of any suitable material that is sufficiently strong and sturdy. Such material may include (but is not limited to metal foil, rubber, silicon, elastomeric, plastic, vinyl, and the like.

The key hassock 2010 is attached to the underside of and the center of the key 1920. Typically, the hassock 2010 has a dual purpose. First, the hassock 2010 aids in making a clean and reliable contact with a key switch (not shown) at the bottom of a keypress. The hassock 2010 provides an unobstructed flat area with a sufficient degree of give (i.e., cushion) to ensure a reliable switch closure of a traditional membrane keyswitch. Second, the hassock 2010 provides a predetermined amount of cushioning (or lack thereof) at the bottom of the keypress to provide a satisfactory approximation of a snap-over of a full-travel key of a keyboard.

Magnets

The magnets for the implementations discussed herein are permanent magnets and, in particular, commercial permanent magnets. The most common types of such magnets include:

Neodymium Iron Boron;

Samarium Cobalt;

Alnico; and

Ceramic.

The above list is in order of typical magnetic strength from strongest to weakest.

Because of their relatively small size and impressive magnetic strength, the implementations described herein utilize Rare Earth Magnets, which are strong permanent magnets made from alloys of rare earth elements. Rare Earth Magnets typically produce magnetic fields in excess of 1.4 teslas, which is fifty to two-hundred percent more than comparable ferrite or ceramic magnets. At least one of the implementations uses neodymium-based magnets.

Alternative implementations may employ electromagnets.

Planar Translational Responsiveness to Vertical Travel

Figure 22A:
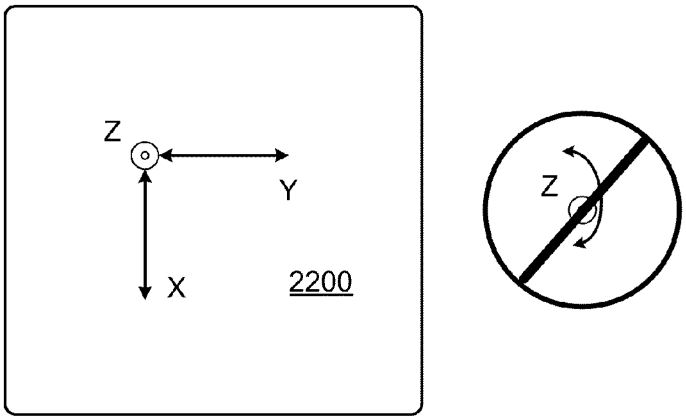
FIGS. 22A, 22B, and 22C show differing views of a fifth implementation of the leveled touchsurface with planar translational responsiveness to vertical travel. A top plan view is shown in FIG. 22A.
Figure 22B:
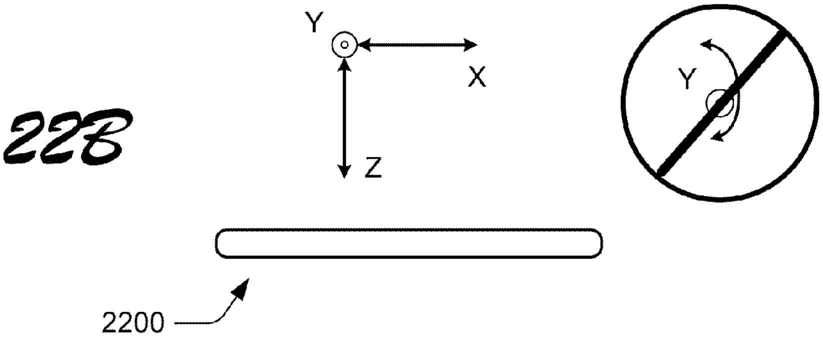
Figure 22C:
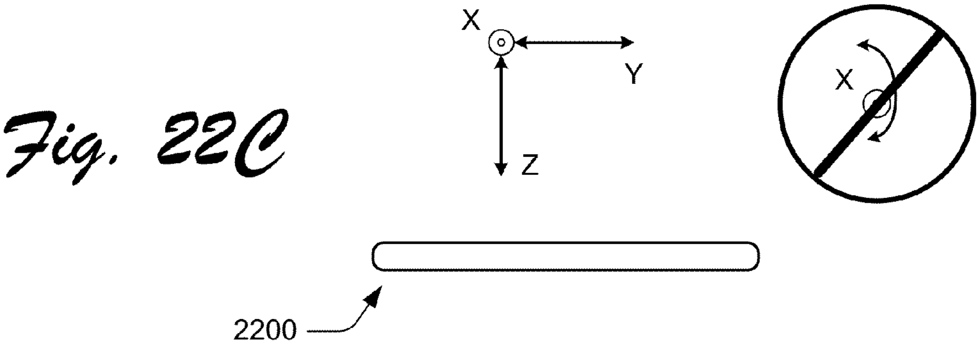

Each of FIGS. 22A, 22B, and 22C show differing views of a simplified and abstracted version of a portion of an exemplary touchsurface 2200 that is suitable for one or more implementations of the techniques described herein. For the sake of simplicity of illustration, the touchsurface 2200 is shown as a rigid rectangular body having greater width and breadth (i.e., X/Y dimensions) than depth (i.e., Z-dimension). Also for the sake of simplicity of illustration, the underlying structures and mechanisms that provide the leveling, planar-translational-responsiveness-to-vertical-travel, and/or other functionalities and operations of the touchsurface are not shown.

In FIG. 22A, the touchsurface 2200 is shown in a top plan view. FIGS. 22B and 22C show the touchsurface 2200 in differing elevation views. As noted by the prohibition pictograms (i.e., circle with a slash) in these figures, the touchsurface is constrained from rotation about all three axes (i.e., X, Y, and Z). That is, the touchsurface 2200 is constrained from rotating at all.

However, the touchsurface 2200 is allowed and enabled to move in the Z-direction (i.e., vertically, down, and/or up). In addition, the touchsurface 2200 is allowed to move in a planar direction in the X/Y plane. That is, the touchsurface 2200 moves in one direction in the X/Y plane that is X, Y, or a combination thereof. Indeed, the touchsurface 2200 is configured to move in the planar direction while also moving in the vertical direction. The combination of movement in these two directions may be called "diagonal." Furthermore, since the touchsurface 2200 does not rotate while moving, this movement is called a "translation" herein. Consequently, the full motion of the touchsurface 2200 is called "planar-translational-responsiveness-to-vertical-travel" herein.

Free-Body Diagram of Another Exemplary Assembly

Figure 23:
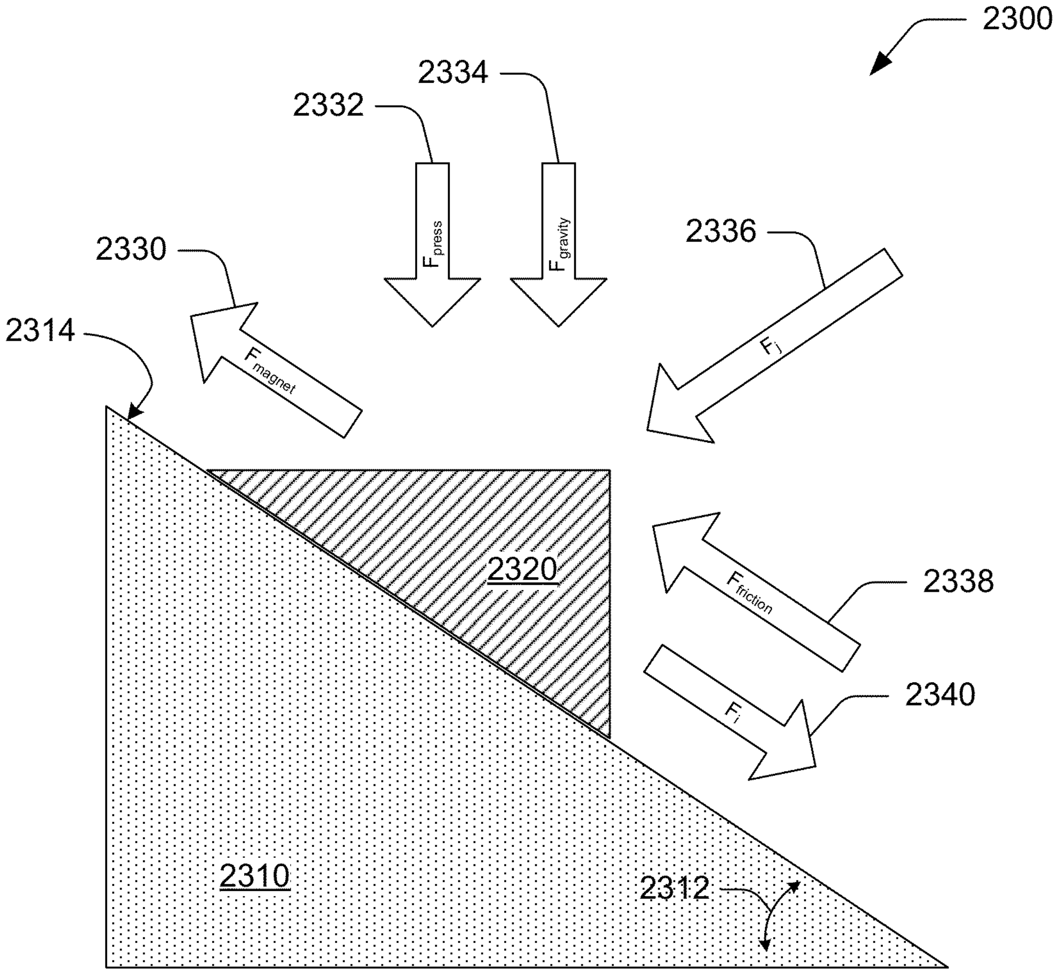
FIG. 23 shows a free-body diagram of a sixth implementation of the leveled touchsurface with planar translational responsiveness to vertical travel.

FIG. 23 shows a free-body diagram of a simplified and abstracted version of an exemplary touchsurface assembly 2300 that is suitable for one or more implementations of the techniques described herein. For the sake of simplicity of illustration, just two of the components of the assembly 2300 are shown: a ramp 2310 and chamfer 2320. The ramp 2310 is a simplified representative of one or more of the ramps of a key guide (like that of key guide 610 shown in FIG. 6). Similarly, the chamfer 2320 is a simplified representative of one or more of the chamfers of a touchsurface (like that of key 320, as shown in FIGS. 3-10). Also for the sake of simplicity of illustration, other structures and mechanisms that provide other functionalities and operations of the assembly are not shown.

Since FIG. 23 is a free-body diagram, it shows several force vectors (as represented by arrows) acting on the chamfer 2320 and/or the ramp 2310. Those vectors include a magnetic force vector ($F_{magnet}$) 2330, user-press force vector ($F_{press}$) 2332, gravitational force vector ($F_{gravity}$) 2334, ramp-face-normal force vector ($F_j$) 2336, frictional force vector ($F_{friction}$) 2338, and ramp-face-parallel force vector ($F_i$) 2340. The angle ($\alpha$) of the ramp 2310 is shown at 2312. In this description, $\mu$ is a known coefficient of friction and g is the gravitational constant.

As depicted, the ramp-face-parallel force vector ($F_i$) 2340 is the sum of the depicted forces acting on the chamfer 2320 in the direction along (i.e., parallel to) a ramp face 2314 of the ramp 2310. The ramp-face-parallel force vector ($F_i$) 2340 includes the magnetic force ($F_{magnet}$) 2330, the frictional force ($F_{friction}$) 2338, and components of the user-press force ($F_{press}$) 2332 and gravitational force ($F_{gravity}$) 2334, at least as they act in the direction parallel to the ramp face 2314. As depicted, the magnetic force ($F_{magnet}$) 2330 points up the ramp 2310 while the ramp-parallel components of the user-press force ($F_{press}$) 2332 and gravitational force ($F_{gravity}$) 2334 act down the ramp. The frictional force ($F_{friction}$) 2338 points in the direction away from motion. That is, when the chamfer 2320 moves down the ramp face 2314, the frictional force points up the ramp 2310. Conversely, when the chamfer moves up the ramp, the frictional force points down the ramp. When the sum of these force vectors ($F_i$) 2340 points up the ramp 2310, the chamfer 2320 will move up until, for example, it stops in the ready position. When the sum of these force vectors ($F_i$) 2340 points down, the chamfer 2320 will move down the ramp 2310 until, for example, it reaches a stop at the bottom.

In its ready position, the chamfer 2320 is held at or near the top of the ramp 2310 because the ramp-face-parallel force ($F_i$) points up the ramp face 2314. This is primarily due to mutual attraction of magnets in the assembly (but not depicted here). The force of that mutual attraction is represented by the magnetic force vector ($F_{magnet}$) 2230. The frictional force ($F_{friction}$) 2338 also acts to keep the chamfer 2320 in its present position and/or slow motion of the chamfer. The chamfer 2320 will remain in this position until the ramp-face-parallel force vector (Fi) 2340 points down the ramp face 2314. This occurs when the sum of the downward ramp parallel forces (which are $F_i$) is greater than the sum of the magnetic force ($F_{magnet}$) 2330 and the frictional force ($F_{friction}$) 2338.

In order to compute the frictional force ($F_{friction}$) 2338, the ramp-face-normal face-normal force ($F_j$) 2336 is determined. As depicted, the force ($F_j$) is the sum of the forces that have a component acting towards (i.e., normal to) the ramp face 2314. As can be seen in the illustration, each of the user-press force vector ($F_{press}$) 2332 and gravitational force vector ($F_{gravity}$) 2334 have a component in the direction normal to the ramp face 2314. The magnitude of these normal force vectors may be determined, for example, by the cosine of the ramp angle ($\alpha$) 2312 according to the following formula: $F_j=(F_{press}+F_{gravity})*\cos(\alpha)$. The frictional force ($F_{friction}$) 2338 can then be computed as the product of the normal force and the coefficient of friction ($\mu$) between the ramp 2310 and chamfer 2320: $F_{friction}=F_j*\mu$.

In a similar manner, the ramp-face-parallel force vector ($F_i$) 2340 can be calculated. The downward ramp-face-parallel force vector is the sum of the user-press force ($F_{press}$) 2332 and gravitational force ($F_{gravity}$) 2334 times the sine of the ramp angle ($\alpha$) 2312. As described earlier and as depicted, the magnetic force ($F_{magnet}$) 2330 points in the upward direction along the ramp 2310 while the frictional force ($F_{friction}$) 2338 acts in the opposite the direction of motion. This can be expressed in these manner:

when moving down the ramp: $F_i=(F_{press}+F_{gravity})*\sin(\alpha)-F_{friction}-F_{magnet}$ and when moving up the ramp: $F_i=(F_{press}+F_{gravity})*\sin(\alpha)+F_{friction}-F_{magnet}$.

In many product designs and applications, the weight of the touchsurface (e.g., key) will be small relative to the user-press force ($F_{press}$) and the magnetic force ($F_{magnet}$). In these cases, the gravitational component can be ignored in both equations for $F_i$. Consequently, if the equation for frictional force ($F_{fricton}$) is substituted into the equation for the ramp-face-parallel force ($F_i$) and the gravitational force is ignored, the following results:

when moving down the ramp: $F_1=F_{press}*\sin(\alpha)-F_{press}*\cos(\alpha)*\mu-F_{magnet}$, and when moving up the ramp: $F_i=F_{press}*\sin(\alpha)+F_{press}*\cos(\alpha)*\mu-F_{magnet}$.

These simplified equations can be used to compute the force acting on the chamfer 2320 as a function of user-press force ($F_{press}$) 2332, magnetic force ($F_{magnet}$) 2330, ramp angle ($\alpha$) 2312, and coefficient of friction ($\mu$).

For the exemplary touchsurface assembly 2300 depicted, the ramp angle ($\alpha$) 2312 is forty-five degrees. For the purpose of illustration only (and not limitation), each of the ramp 2310 and the chamfer 2320 is composed of acetal resin (e.g., DuPont™ brand Delrin®). Those of skill in the art know that the coefficient of friction ($\mu$) for two acetal resin surfaces is 0.2. In the case of this example, the forces acting on the chamfer 2320 in the ramp-face parallel direction are During a down-ramp movement: $F_i=(0.8*0.717)*F_{press}-F_{magnet}$ During an up-ramp movement: $F_i=(1.2*0.717)*F_{press}-F_{magnet}$ These equations can also be used to determine the breakaway and return forces as a function of magnetic force at both the ready position and end stop:

To breakaway: $F_{press}>1.77F_{magnet}$ (at ready position)

To return: $F_{press}<1.18F_{magnet}$ (at end stop)

Consequently, the system can be designed to meet a specified user-press press force ($F_{press}$) 2332 by selecting the appropriate magnetic force ($F_{magnet}$) 2330. For example, for a desired 60 gram breakaway force, the magnetic force vector $F_{magnet}$ may be about 35 grams.

Exemplary Computing System and Environment

Figure 24:
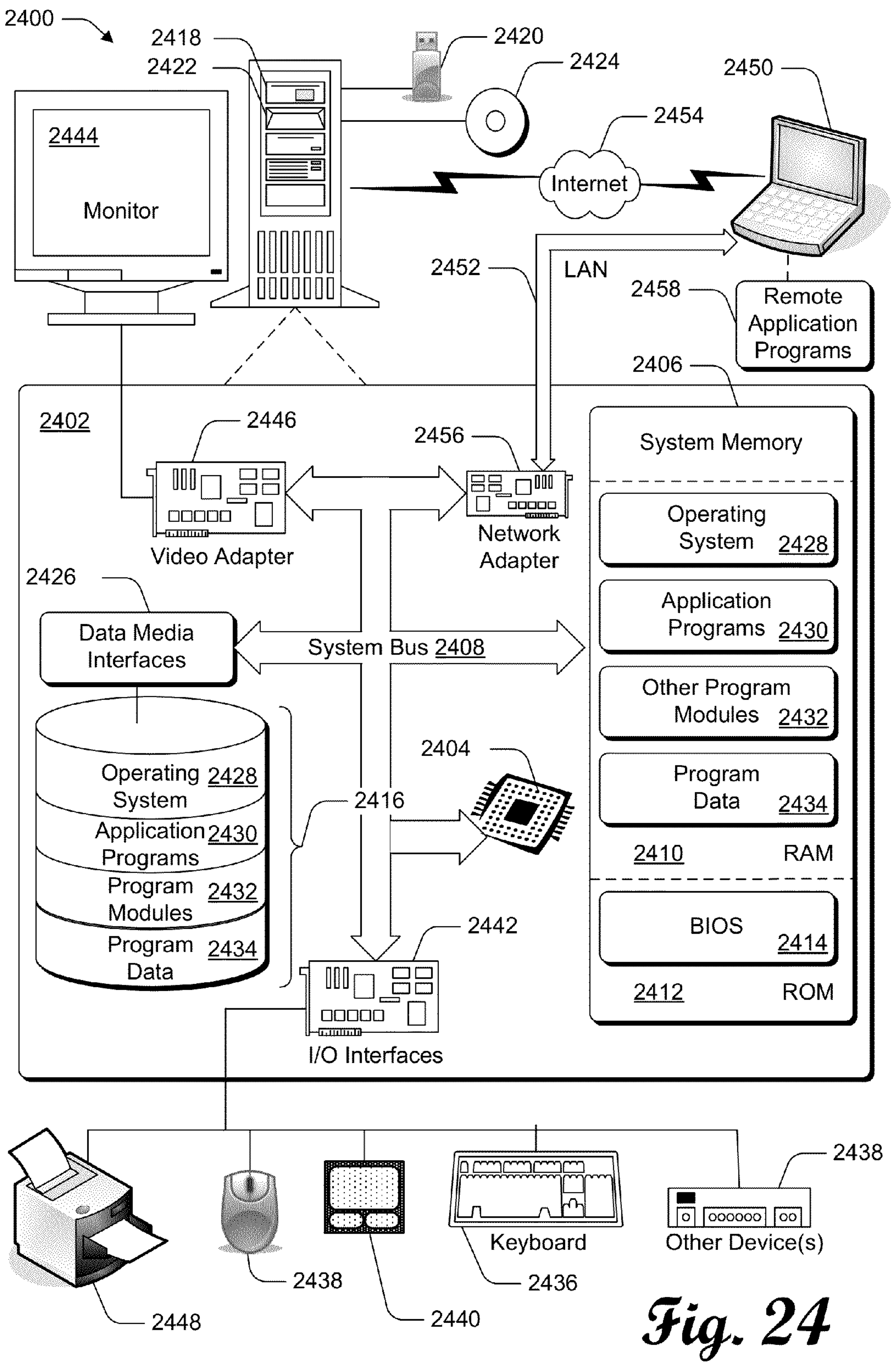
FIG. 24 illustrates an exemplary computing environment suitable for one or more implementations of the techniques described herein.

FIG. 24 illustrates an example of a suitable computing environment 2400 within which one or more implementations, as described herein, may be implemented (either fully or partially). The exemplary computing environment 2400 is only one example of a computing environment and is not intended to suggest any limitation as to the scope of use or functionality of the computer and network architectures. Neither should the computing environment 2400 be interpreted as having any dependency or requirement relating to any one component, or combination of components, illustrated in the exemplary computing environment 2400.

The one or more implementations, as described herein, may be described in the general context of processor-executable instructions, such as program modules, being executed by a processor. Generally, program modules include routines, programs, objects, components, data structures, etc. that perform particular tasks or implement particular abstract data types.

The computing environment 2400 includes a general-purpose computing device in the form of a computer 2402. The components of computer 2402 may include, but are not limited to, one or more processors or processing units 2404, a system memory 2406, and a system bus 2408 that couples various system components, including the processor 2404, to the system memory 2406.

The system bus 2408 represents one or more of any of several types of bus structures, including a memory bus or memory controller, a peripheral bus, an accelerated graphics port, and a processor or local bus using any of a variety of bus architectures.

Computer 2402 typically includes a variety of processor-readable media. Such media may be any available media that is accessible by computer 2202 and includes both volatile and non-volatile media, removable and non-removable media.

The system memory 2406 includes processor-readable media in the form of volatile memory, such as random access memory (RAM) 2410, and/or non-volatile memory, such as read only memory (ROM) 2412. A basic input/output system (BIOS) 2414, containing the basic routines that help to transfer information between elements within computer 2402, such as during start-up, is stored in ROM 2412. RAM 2410 typically contains data and/or program modules that are immediately accessible to and/or presently operated on by the processing unit 2404.

Computer 2402 may also include other removable/non-removable, volatile/non-volatile computer storage media. By way of example, FIG. 24 illustrates a hard disk drive 2416 for reading from and writing to a non-removable, non-volatile magnetic media (not shown), a magnetic disk drive 2418 for reading from and writing to a removable, non-volatile flash memory data storage device 2420 (e.g., a "flash drive"), and an optical disk drive 2422 for reading from and/or writing to a removable, non-volatile optical disk 2424 such as a CD-ROM, DVD-ROM, or other optical media. The hard disk drive 2416, flash drive 2418, and optical disk drive 2422 are each connected to the system bus 2408 by one or more data media interfaces 2426. Alternatively, the hard disk drive 2416, magnetic disk drive 2418, and optical disk drive 2422 may be connected to the system bus 2408 by one or more interfaces (not shown).

The drives and their associated processor-readable media provide non-volatile storage of processor-readable instructions, data structures, program modules, and other data for computer 2402. Although the example illustrates a hard disk 2416, a removable magnetic disk 2420, and a removable optical disk 2424, it is to be appreciated that other types of processor-readable media, which may store data that is accessible by a computer (such as magnetic cassettes or other magnetic storage devices, flash memory cards, floppy disks, compact disk (CD), digital versatile disks (DVD) or other optical storage, random access memories (RAM), read only memories (ROM), electrically erasable programmable read-only memory (EEPROM), and the like), may also be utilized to implement the exemplary computing system and environment.

Any number of program modules may be stored on the hard disk 2416, magnetic disk 2420, optical disk 2424, ROM 2412, and/or RAM 2410, including, by way of example, an operating system 2428, one or more application programs 2430, other program modules 2432, and program data 2434.

A user may enter commands and information into computer 2402 via input devices such as a keyboard 2436 and one or more pointing devices, such as a mouse 2438 or touchpad 2440. Other input devices 2438 (not shown specifically) may include a microphone, joystick, game pad, camera, serial port, scanner, and/or the like. These and other input devices are connected to the processing unit 2404 via input/output interfaces 2442 that are coupled to the system bus 2408, but may be connected by other interfaces and bus structures, such as a parallel port, game port, universal serial bus (USB), or a wireless connection such as Bluetooth.

A monitor 2444, or other type of display device, may also be connected to the system bus 2408 via an interface, such as a video adapter 2446. In addition to the monitor 2444, other output peripheral devices may include components, such as speakers (not shown) and a printer 2448, which may be connected to computer 2402 via the input/output interfaces 2442.

Computer 2402 may operate in a networked environment using logical connections to one or more remote computers, such as a remote computing device 2450. By way of example, the remote computing device 2450 may be a personal computer, a portable computer, a server, a router, a network computer, a peer device or other common network node, and the like. The remote computing device 2450 is illustrated as a portable computer that may include many or all of the elements and features described herein, relative to computer 2402. Similarly, the remote computing device 2450 may have remote application programs 2458 running thereon.

Logical connections between computer 2402 and the remote computer 2450 are depicted as a local area network (LAN) 2452 and a general wide area network (WAN) 2454. Such networking environments are commonplace in offices, enterprise-wide computer networks, intranets, and the Internet.

When implemented in a LAN networking environment, the computer 2402 is connected to a wired or wireless local network 2452 via a network interface or adapter 2456. When implemented in a WAN networking environment, the computer 2402 typically includes some means for establishing communications over the wide network 2454. It is to be appreciated that the illustrated network connections are exemplary and that other means of establishing communication link(s) between the computers 2402 and 2450 may be employed.

In a networked environment, such as that illustrated with computing environment 2400, program modules depicted relative to the computer 2402, or portions thereof, may be stored in a remote memory storage device.

Additional and Alternative Implementation Notes

While the implementations of the touchsurface described herein have primarily focused on a key of a keyboard, other implementations of leveled touchsurface with planar translational responsiveness to vertical travel are available and desirable. For example, a touchsurface implementing the new techniques described herein may be (listed for illustrative purposes and not limitation) a touchscreen, a touchpad, a pointing device, and any device with a human-machine interface (HMI) that a human touches. Examples of suitable HMI devices include (by way of illustration and not limitation) keyboard, key pad, pointing device, mouse, trackball, touchpad, joystick, pointing stick, game controller, gamepad, paddle, pen, stylus, touchscreen, touchpad, foot mouse, steering wheel, jog dial, yoke, directional pad, and dance pad.

Examples of computing systems that may employ a HMI device constructed in accordance with the techniques described herein include (but are not limited to): cell phone, smartphone (e.g., the iPhone™), tablet computer (e.g., the iPad™), monitor, control panel, vehicle dashboard panel, laptop computer, notebook computer, netbook computer, desktop computer, server computer, gaming device, electronic kiosk, automated teller machine (ATM), networked appliance, point-of-sale workstation, medical workstation, and industrial workstation.

For instance, a touchscreen of a tablet computer or smartphone may be constructed in accordance with the techniques described herein. If so, the user may be able to select an on-screen icon or button by pressing on the touchscreen. In response, the touchscreen may move down and laterally and give the user an impression of a much greater downward movement of the screen.

Also, suppose a laptop computer has a touchpad constructed in accordance with the techniques described herein. Without having to press any other mechanical buttons, the user may select an on-screen icon or button by pressing down on the touchpad. In response, the touchpad may translation downward and laterally and give the user an impression of a much greater downward movement of the screen. Alternatively, the touchpad may just move downward substantially vertically while pushing a biased guide to slide in a lateral direction.

In some implementations, an exemplary touchsurface (e.g., key, touchscreen, touchpad) may be opaque. In other implementations, an exemplary touchsurface may be fully or partially translucent or transparent.

The following U.S. patent applications are incorporated in their entirety by reference herein:

U.S. patent application Ser. No. 12/580,002, filed on Oct. 15, 2009;

U.S. Provisional Patent Application Ser. No. 61/347,768, filed on May 24, 2010;

U.S. Provisional Patent Application Ser. No. 61/410,891, filed on Nov. 6, 2010;

U.S. patent application Ser. No. 12/975,733, filed on Dec. 22, 2010;

U.S. Provisional Patent Application Ser. No. 61/429,749, filed on Jan. 4, 2011;

U.S. Provisional Patent Application Ser. No. 61/471,186, filed on Apr. 3, 2011.

One or more of the implementations may employ force-sensing technology to detect how hard a user presses down on a touchsurface (e.g., key, touchsurface, touchscreen).

Examples of other touchsurface implementations and variations may include (by way of example and not limitation): a toggle key, slider key, slider pot, rotary encoder or pot, navigation/multi-position switch, and the like.

Toggle Key—As described herein, a toggle key is a levered key that pivots at its base. A toggle key implementation may have mutually attractive magnets on both sides of a keyhole so that as a user moves the toggle away from one magnet. This would create a snap over feel and would hold the toggle in the desired positions.

Slider Key—This is similar to the toggle key, except instead of pivoting, it slides.

Slide Pot—This is similar to a slider key, except the travel is much longer. It may be desirable to have detents for the slider as it moves along and magnets may be used to accomplish this. Magnets may be used at the ends and in the middle to define these points. Also, magnets of differing strengths may be used to provide different tactile responses.

Rotary encoder or pot—Magnets could be used around the perimeter to provide detents. Implementations might use hard and soft detents.

Navigation/Multi-Position switch—This is a multi-direction switch. An implementation may use magnets in all directional quadrants and the switch would levitate between them.

It is to be appreciated and understood that other types of ready/return mechanisms can be utilized without departing from the spirit and scope of the claimed subject matter. For example, alternative return mechanisms might restore the touchsurface to its ready position using magnetic repulsion pushing the touchsurface back up. Other alternatively return mechanisms might not use magnetic or electromagnetic forces. Instead, perhaps, biasing or spring forces may be used to push or pull the key to its ready position and keep the touchsurface in that position. Examples of alternative mechanisms include (but are not limited to) springs, elastic bands, and tactile domes (e.g., rubber dome, elastomeric dome, metal dome, and the like).

In addition, multiple mechanisms may be used to accomplish the return and ready functions separately. For example, one mechanism may retain the touchsurface in its ready position and a separate mechanism may return the touchsurface to its ready position.

Likewise, it is to be appreciated and understood that other types of leveling/planar-translation-effecting mechanisms can be utilized without departing from the spirit and scope of the claimed subject matter. For example, alternative leveling/planar-translation-effecting mechanisms might level a touchsurface without ramps and/or might impart a planar translation from a vertical movement without using ramps or magnetic or electromagnetic forces.

Examples of alternative leveling/planar-translation-effecting mechanisms include (but are not limited to) a four-bar linkage mechanism and a rib-and-groove mechanism. With a four-bar linkage mechanism, the touchsurface would act as the top bar and the base would be the bottom bar. When the touchsurface is pressed down, the mechanism would be configured to constrain the swing of the touchsurface down and in one planar direction. With a rib-and-groove mechanism, the touchsurface would have ribs that would ride along a sloped path of grooves of the podium. The confined path of a groove would include a component of Z-direction travel and a planar direction travel. Of course, the touchsurface may have the grooves and the podium have the ribs.

In addition, multiple mechanisms may be used to accomplish these functions. For example, one mechanism may level the touchsurface and a separate mechanism may impart the planar translation to the touchsurface.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Features, Aspects, Functions, Etc. of Implementations

The following enumerated paragraphs represent illustrative, non-exclusive descriptions of methods, systems, devices, etc. according to the techniques described herein:

A. A touchsurface (e.g., key) having a lateral translation imparted upon it during a human-imparted Z-direction force on that key (especially when such lateral travel is not caused by a motor of any kind).

A1. The touchsurface of paragraph A, wherein magnetic repulsion and/or attraction imparts the lateral travel.

A2. The touchsurface of paragraph A, wherein multiple ramps impart the lateral travel in response to a downward force.

B. A cantilevered retention of key (especially when hold is by magnetic attraction) in its ready position.

C. Holding a key laterally (e.g., interior of keyhole 1312 holding (e.g., via magnetic attraction) the key thereto) in its ready position.

D. Magnetic repulsion or attraction to impart a lateral travel to a key during Z-direction travel (which is the up/down movement of key in response to a keypress and key release).

E. Magnetic attraction to return the key to its original position—that attraction may impart both a lateral and Z-direction movement of the key.

F. Stacking and alternating pole arrangement of two of more podium magnets.

G. Arrangement of the key-receiving cavity (e.g., keyhole 1312) and shape of key to fit together for the purpose of allowing lateral translation of the key during a keypress.

H. Backlighting arrangement—lighting element under a transparent or translucent key.

I. Alternative magnet arrangement for a stack of multiple (3+) magnets with alternating poles (to impart multilateral movement (e.g., back and forth in X or Y direction) of key during Z-direction travel).

J. Such alternative magnet arrangement may include an array of magnets dispersed about a key-receiving cavity (e.g., keyhole 1312) to impart a multi-vectored lateral translation (e.g., in both X and Y directions) of the key during Z-direction travel.

K. Multiple ramp-pairings between the podium and the key to perform both leveling and Z-direction to lateral direction force transference on the key.

L. An apparatus comprising at least one touchsurface configured to provide a satisfying tactile keypress experience for a user via planar translation responsiveness to a vertical travel of the touchsurface.

M. An apparatus comprising at least one touchsurface configured to provide a satisfying tactile keypress experience for a user without a haptic motor.

N. An apparatus comprising at least one touchsurface configured to provide a satisfying tactile keypress experience for a user without an active actuator.

O. An apparatus comprising at least one touchsurface configured to translate in a multi-vectored manner in response to a single-vector force imparted by a user's contact with the surface.

P. An apparatus of paragraphs L-O, wherein the touchsurface is a key or a touchscreen.

Q. An apparatus of paragraphs L-O, wherein the touchsurface is transparent or translucent.

R. A human-computer interaction device comprising:

a podium defining a hole therein, wherein one or more podium magnets are mounted to the podium so as to magnetically expose at least one pole of the one or more podium magnets to the interior of the hole;

a touchsurface shaped to fit into the hole and suspended over and/or within the hole, wherein one or more touchsurface magnets are mounted to the touchsurface so as to magnetically expose at least one pole of the one or more touchsurface magnets, the exposed pole of the one or more touchsurface magnets being opposite of the exposed pole of the one or more podium magnets, wherein a magnetic coupling between the exposed pole of the one or more touchsurface magnets and the exposed pole of the one or more podium magnets suspends the touchsurface over and/or into the hole of the podium.

S. A human-computer interaction device as recited in paragraph R, wherein the touchsurface is a key or a touchscreen.

T. A human-computer interaction device as recited in paragraph R, wherein the touchsurface is transparent or translucent.

U. A human-computer interaction device as recited in paragraph R, wherein the touchsurface is suspended in a cantilevered fashion over and/or in the hole of the podium.

V. A human-computer interaction device as recited in paragraph R, wherein the magnetic coupling between the exposed pole of the one or more touchsurface magnets and the exposed pole of the one or more podium magnets is configured to release when a downward force of a typical keypress is applied to the touchsurface.

W. A human-computer interaction device as recited in paragraph V, wherein the magnetic coupling between the exposed pole of the one or more touchsurface magnets and the upper pole of the one or more podium magnets is restored after the downward force of the keypress is released.

X. A human-computer interaction device as recited in paragraph W, wherein the restoration of the magnetic coupling moves the touchsurface, both up and laterally, back to its original suspended position.

Y. A human-computer interaction device as recited in paragraph R, wherein the podium and/or touchsurface includes one or more structures configured to redirect at least some of a downward force applied to the touchsurface to move the key laterally during its downward travel.

Z. A human-computer interaction device as recited in paragraph R, wherein the podium magnets include at least two magnets arranged in a stacked manner so that an upper magnet has the exposed pole coupled to the exposed pole of the touchsurface's magnet and the lower magnet has its own exposed pole, which is opposite on polarity to that of the upper magnet's exposed pole.

AA. A human-computer interaction device as recited in paragraph Z, wherein a magnetic repulsion between the like poles of the exposed pole of the one or more touchsurface magnets and the lower pole of the one or more podium magnets pushes the touchsurface laterally during the touchsurface downward movement into the hole in the podium.

BB. A human-computer interaction device comprising a cantilevered key suspended over a cavity configured to receive the key when a downward force is applied to the key.

CC. A human-computer interaction device comprising a magnetically coupled cantilevered touchsurface suspended over a cavity configured to receive the touchsurface when a downward force is applied to the touchsurface.

DD. A human-computer interaction device as recited in paragraph CC, wherein the touchsurface is a key and/or a touchscreen.

EE. A human-computer interaction device as recited in paragraph CC, wherein the device is further configured to magnetically repell the freed touchsurface in the cavity after a downward force moves the touchsurface into the cavity.

FF. A human-computer interaction device comprising a touchsurface suspended over a cavity configured to receive the touchsurface, wherein a sidewall of the touchsurface is magnetically coupled to an interior wall of the cavity.

GG. A human-computer interaction device comprising:

a podium with a cavity defined therein;

a touchsurface suspended over the cavity, the touchsurface being configured to fit into the cavity when a downward force is applied to the touchsurface to move the touchsurface into the cavity;

two or more magnets operatively connected to each of the podium and the touchsurface, the magnets being arranged to impart a lateral movement on the touchsurface when the downward force is applied to the touchsurface to move the touchsurface into the cavity.

HH. A human-computer interaction device as recited in paragraph GG, wherein the lateral movement is imparted by a magnetic repulsion between two or more magnets.

II. A human-computer interaction device as recited in paragraph GG, wherein the lateral movement is imparted by a magnetic attraction between two or more magnets.

JJ. A human-computer interaction device as recited in paragraph GG, wherein the lateral movement includes movement in more than one lateral direction.

KK. A method of passive-translational responsiveness comprising:

receiving a force in a downward direction upon a magnetically coupled touchsurface that is suspended over and/or in a cavity configured to receive the touchsurface when a downward force is applied to the touchsurface;

in response to the receiving of the downward force, releasing the magnet coupling suspending the touchsurface;

imparting a lateral translation upon the touchsurface as it descends into the cavity.

LL. A method of passive-translational responsiveness as recited in paragraph KK, further comprising, in response to a release of sufficient force, returning the touchsurface to its original suspended position over and/or in the cavity.

MM. A method of passive-translational responsiveness as recited in paragraph KK, further comprising constraining the touchsurface from rotation in response to the receiving of the downward force.

NN. A key assembly comprising:
a key presented to a user to be depressed by the user;
a leveling mechanism operatively associated with the key, the leveling mechanism being configured to constrain the key to prevent rotation thereof;
a diagonal-movement-imparting mechanism operatively associated with the key, the diagonal-movement-imparting mechanism being configured to impart a diagonal movement to the key while the key travels vertically in response to a user's downpress and/or removal of sufficient force to keep the key depressed.

OO. A touchpad assembly comprising:
a touchpad presented to a user to be depressed by the user;
a leveling mechanism operatively associated with the touchpad, the leveling mechanism being configured to constrain the touchpad to prevent rotation thereof;
a biased guide mechanism operatively associated with the touchpad, the biased guide mechanism being configured to be slid laterally in response to being pushed by the touchpad during its substantially vertical downward travel and the biased guide mechanism being further configured to urge the touchpad back up to its original position.

PP. A laptop computer comprising:
a hinged lid/screen;
a keyboard with magnetically suspended keys with each key having its own keyhole thereunder for receiving the key, the keyboard being opposite there of the hinged lid/screen;
a key-retraction system configured to retract the magnetically suspended keys into their respective keyholes, wherein the key-retraction system retracts the keys in response an indication of lid/screen closure.

QQ. A keyboard comprising:
a keyboard chassis;
multiple key assemblies supported by the keyboard chassis, wherein each key assembly comprises:
a key presented to a user to be depressed by the user;
a leveling mechanism operatively associated with the key, the leveling mechanism being configured to constrain the key to a level orientation while the key is depressed by the user;
a planar-translation-effecting mechanism operatively associated with the key, the planar-translation-effecting mechanism being configured to impart a planar translation to the key while the key travels downward as the key is depressed by the user RR. A computing system comprising a keyboard as recited in paragraph QQ.

SS. A human-machine interaction (HMI) apparatus comprising:
a touchsurface presented to a user to facilitate, at least in part, human to computer interaction therethrough by the user depressing the touchsurface;
a translational mechanism operatively associated with the touchsurface, the translational mechanism being configured to constrain the touchsurface to prevent rotation of the touchsurface but enable a translation in response to a downward force from the user depressing the touchsurface.

TT. An HMI apparatus as recited in in paragraph SS, wherein the translational mechanism includes multiple supports positioned under and/or around the touchsurface so as to ameliorate and/or eliminate wobbling, shaking, and/or tilting of the touchsurface while the touchsurface travels downward as the user depresses the touchsurface.

UU. An HMI apparatus as recited in paragraph SS, wherein the translational mechanism includes multiple supports arrayed along a periphery of an underside of the touchsurface, along a perimeter of the touchsurface, and/or outside the periphery of the touchsurface.

VV. An HMI apparatus as recited in paragraph SS, wherein the translational mechanism is configured to impart a planar movement translation to the touchsurface while the touchsurface travels downward as the user depresses the touchsurface.

WW. An HMI apparatus as recited in paragraph SS, wherein the translational mechanism includes multiple ramps arrayed along a periphery of an underside of the touchsurface, along a perimeter of the touchsurface, and/or outside the periphery of the touchsurface.

XX. An HMI apparatus as recited in paragraph SS, wherein the translational mechanism includes a four-bar linkage mechanism, wherein a rigid sidebar is hinged to opposite edges of the touchsurface and also to a base thereunder the touchsurface.

YY. An HMI apparatus as recited in paragraph SS, wherein the translational mechanism includes a rib-and-groove mechanism, wherein one or more ribs of the touchsurface ride in one or more grooves of a structure defining a cavity within which a touchsurface desends when traveling vertically.

What is claimed is:

1. A keyboard comprising:
a plurality of keycaps;
a keyguide configured to guide keycap motion, the keyguide comprising:
a plurality of combined leveling and planar-translation-effecting (CLPTE) mechanisms, each CLPTE mechanism of the plurality of CLPTE mechanisms associated with a keycap of the plurality of keycaps, each CLPTE mechanism configured to define a planar translation component of an associated path travelled by the associated keycap in response to press input applied to the associated keycap by a user, and each CLPTE mechanism further configured to keep the associated keycap substantially level as the associated keycap travels along the associated path;
a plurality of ready/return mechanisms, each ready/return mechanism of the plurality of ready/return mechanisms corresponding with a keycap of the plurality of keycaps, each ready/return mechanism comprising a first component attached to the corresponding keycap and a second component attached to the keyguide proximate to the CLPTE mechanism associated with the corresponding keycap, wherein the first component and the second component of each ready/return mechanism utilize non-contact forces to maintain the corresponding keycap in an unpressed position when not pressed and to return the corresponding keycap to the unpressed position in response to a release of the press input; and
a key-retraction system configured to retract the plurality of keycaps into a corresponding plurality of keyholes.

2. The keyboard of claim 1, wherein the first and second components of each ready/return mechanism is configured to utilize non-contact forces by utilizing magnetic forces.

3. The keyboard of claim 1, wherein each CLPTE mechanism of the plurality of CLPTE mechanisms comprises multiple inclined surfaces configured to contact multiple inclined features on the associated keycap and form multiple slidable interfaces between the keyguide and the associated keycap.

4. The keyboard of claim 1, wherein each CLPTE mechanism of the plurality of CLPTE mechanisms comprises multiple linkages configured to be rotatably attached to multiple attachment locations on the associated keycap and form multiple rotatable interfaces between the keyguide and the associated keycap.

5. The keyboard of claim 1, wherein a first keycap of the plurality of keycaps has an associated path that differs from the associated path of a second keycap of the plurality of keycaps.

6. The keyboard of claim 5, wherein the associated path of the first keycap differs from the associated path of the second keycap in an amount of planar translation.

7. The keyboard of claim 5, further comprising a base, wherein the associated path of the first keycap differs from the associated path of the second keycap in a path angle relative to the base.

8. The keyboard of claim 1, further comprising a base, wherein a first keycap of the plurality of keycaps has an associate path with an amount of planar translation equivalent to that of a linear path forming an angle with the base no less than thirty-five degrees and no more than sixty-five degrees.

9. The keyboard of claim 8, wherein the associated path of the first keycap is linear.

10. The keyboard of claim 1, wherein the keyboard is part of a human-machine interaction (HMI) device with a lid opposite the keyboard, and wherein the key-retraction system is configured to retract the plurality of keycaps in response to a closure of the lid.

11. A key assembly comprising a keycap;

a combined leveling and planar-translation-effecting (CLPTE) mechanism operatively coupled to the keycap, wherein the CLPTE mechanism defines a planar translation component of a path travelled by the keycap in response to a press applied to the keycap by a user, and wherein the CLPTE mechanism is configured to keep the keycap substantially level as the keycap travels along the path in response to the press;

a ready/return mechanism operatively associated with the keycap, the ready/return mechanism configured to maintain the keycap in an unpressed position and to return the keycap to the unpressed position in response to a release of the press, wherein the ready/return mechanism does not comprise an elastomer; and a key-retraction system configured to retract the keycap into a keyhole.

12. The key assembly of claim 11, wherein the ready/return mechanism comprises magnetic material.

13. The key assembly of claim 11, wherein the keycap is coupled to the CLPTE mechanism at multiple coupling interfaces having relative translational degrees of freedom.

14. The key assembly of claim 11, wherein the CLPTE mechanism comprises a plurality of ramps disposed proximate to a perimeter of the keycap, and wherein the plurality of ramps comprise the multiple coupling interfaces having relative translational degrees of freedom.

15. The key assembly of claim 11, wherein the keycap is coupled to the CLPTE mechanism at multiple coupling interfaces having relative rotational degrees of freedom.

16. The keyboard of claim 11, further comprising a base, wherein the keycap has an associate path with an amount of planar translation equivalent to that of a linear path forming an angle with the base no less than thirty-five degrees and no more than sixty-five degrees.

17. A key assembly comprising a keycap having an exterior face configured to be pressed by a user and an interior face comprising a first plurality of ramp features;

a key guide comprising a second plurality of ramp features configured to contact the first plurality of ramp features, such that the first plurality of ramp features and the second plurality of ramp features together define a planar translation component of a path travelled by the keycap in response to a press applied to the keycap by a user;

a tactile feedback mechanism operatively associated with the keycap, the tactile feedback mechanism configured to provide a resisting force in response to the press; and a key-retraction system configured to retract the keycap into a keyhole.

18. The key assembly of claim 17, wherein the tactile feedback mechanism is further configured to provide a return force to the keycap to return the keycap to the unpressed position in response to a release of the press.

19. The key assembly of claim 18, wherein the tactile feedback mechanism comprises magnetic material, and the resisting and return forces are based on magnetic forces.

20. The key assembly of claim 18, wherein the tactile feedback mechanism comprises an elastomeric protrusion configured to buckle as the keycap moves along the path in response to the press.

21. The key assembly of claim 18, wherein the first and second pluralities of ramp features are configured to keep the keycap substantially level as the keycap travels along the path in response to the press.

22. The keyboard of claim 17, further comprising a base, wherein the keycap has an associate path with an amount of planar translation equivalent to that of a linear path forming an angle with the base no less than thirty-five degrees and no more than sixty-five degrees.

* * * * *